(12) United States Patent
Wang et al.

(10) Patent No.: US 12,126,134 B2
(45) Date of Patent: Oct. 22, 2024

(54) SYSTEMS AND METHODS TO INCREASE PUMP CONVERSION EFFICIENCY OF AN OPTICAL FIBER

(71) Applicants: HUAWEI TECHNOLOGIES CANADA CO., LTD., Kanata (CA); Université Laval, Quebec (CA)

(72) Inventors: Lixian Wang, Quebec (CA); Charles Matte-Breton, Québec (CA); Sophie La Rochelle, Québec (CA); Frédéric Maes, Québec (CA); Zhiping Jiang, Kanata (CA)

(73) Assignees: HUAWEI TECHNOLOGIES CANADA CO., LTD., Kanata (CA); Université Laval, Quebec (CA)

( * ) Notice: Subject to any disclaimer, the term of this patent is extended or adjusted under 35 U.S.C. 154(b) by 685 days.

(21) Appl. No.: 17/396,268

(22) Filed: Aug. 6, 2021

(65) Prior Publication Data
US 2023/0038367 A1 Feb. 9, 2023

(51) Int. Cl.
*H01S 3/30* (2006.01)
*H01S 3/067* (2006.01)
(Continued)

(52) U.S. Cl.
CPC ...... *H01S 3/09415* (2013.01); *H01S 3/06716* (2013.01); *H01S 3/0672* (2013.01);
(Continued)

(58) Field of Classification Search
CPC ............ H01S 3/09415; H01S 3/06716; H01S 3/0672; H01S 3/06754; H01S 3/094007; H01S 3/094069; H01S 3/1608; H01S 3/1618; H01S 3/06729; H01S 3/06733; H01S 3/06766; H01S 3/176; H01S 2301/02
See application file for complete search history.

(56) References Cited

U.S. PATENT DOCUMENTS 5,731,892 A    3/1998 DiGiovanni et al.
6,560,009 B1   5/2003 Andrejco et al.
(Continued)

OTHER PUBLICATIONS

G. G. Vienne, W. S. Brocklesby, R. S. Brown, Z. J. Chen, J. D. Minelly, J. E. Roman, and D. N. Payne, "Role of Aluminum in Ytterbium-Erbium Codoped Phosphoaluminosilicate Optical Fibers," Optical Fiber Technology 2, 387-393 (May 22, 1996).
(Continued)

*Primary Examiner* — Kinam Park

(57) ABSTRACT

An optical fiber configured to improve the pump conversion efficiency of an L-band fiber amplifier which uses the multimode pump source. By directly absorbing multimode light including 915 nm, an active fiber core region co-doped with both erbium and ytterbium can provide gain to the L-band signals via stimulated emission. The unwanted C-band amplified spontaneous emission (ASE) light generate from this active fiber core region can be absorbed by another active fiber core region doped with erbium, then provides additional gain to the L-band signals. Active regions and cladding can be configured to match a given spatial mode of the optical signal. Signal-pump combiners with end-coupling or side coupling can be used.

18 Claims, 31 Drawing Sheets

(51) Int. Cl.
*H01S 3/094* (2006.01)
*H01S 3/0941* (2006.01)
*H01S 3/16* (2006.01)
*H01S 3/17* (2006.01)

(52) U.S. Cl.
CPC .... *H01S 3/06754* (2013.01); *H01S 3/094007* (2013.01); *H01S 3/094069* (2013.01); *H01S 3/1608* (2013.01); *H01S 3/1618* (2013.01); H01S 3/06729 (2013.01); H01S 3/06733 (2013.01); H01S 3/06766 (2013.01); H01S 3/176 (2013.01); H01S 2301/02 (2013.01)

(56) References Cited

U.S. PATENT DOCUMENTS

| | | | |
|---|---|---|---|
| 7,848,014 | B2 | 12/2010 | Sweeney et al. |
| 8,908,722 | B2 | 12/2014 | Creeden |
| 10,348,051 | B1* | 7/2019 | Shah ................. G01S 17/34 |
| 2002/0126974 | A1* | 9/2002 | Bayart ............... H01S 3/06716 359/341.1 |
| 2008/0239471 | A1* | 10/2008 | Tamaoki ............ H01S 3/06754 359/341.3 |
| 2013/0101261 | A1* | 4/2013 | Cadier ................. G02B 6/036 65/390 |
| 2017/0155225 | A1* | 6/2017 | Villeneuve .......... H01S 3/06754 |
| 2019/0221988 | A1* | 7/2019 | Villeneuve .......... G01S 7/4865 |
| 2019/0375672 | A1* | 12/2019 | Chandra ............... H01S 3/1608 |
| 2021/0036480 | A1* | 2/2021 | Corsi .................. H01S 3/06729 |

OTHER PUBLICATIONS

C. Lei, C. Lei, H. Feng, Y. Messaddeq, and S. LaRochelle, "Investigation of C-band pumping for extended L-band EDFAs," J. Opt. Soc. Am. B, JOSAB 37, 2345-2352 (Jun. 19, 2020).

E. Yahel and A. Hardy, "Efficiency optimization of high-power, Er 3+ -Yb 3+ -codoped fiber amplifiers for wavelength-division-multiplexing applications," J. Opt. Soc. Am. B, JOSAB 20, 1189-1197 (Jun. 2003).

K. Bai, Q. Sheng, S. Fu, H. Zhang, Y. Cao, Z. Xie, W. Shi, and J. Yao, "ASE Suppression in Backward-Pumped Er/Yb Double-Cladding Fiber Amplifier via Cladding Feedback," IEEE Photonics Journal 8, 1-7 (Dec. 2016).

G. Melin, R. Kerampran, A. Monteville, S. Bordais, T. Robin, D. Landais, A. Lebreton, Y. Jaouen, and T. Taunay, "Power efficient all-fiberized 12-core erbium/ytterbium doped optical amplifier," in Optical Fiber Communication Conference (OFC) 2020 (2020), Paper M4C.2 (Optical Society of America, 2020), p. M4C.2.

C. Matte-Breton, R. Ryf, N. K. Fontaine, R .- J. Essiambre, H. Chen, C. Kelly, Y. Massadeq, and S. LaRochelle, "Modeling and Characterization of Cladding-Pumped Erbium-Ytterbium Co-doped Fibers for Amplification in Communication Systems," Journal of Lightwave Technology 1-1 (Apr. 1, 2020).

* cited by examiner

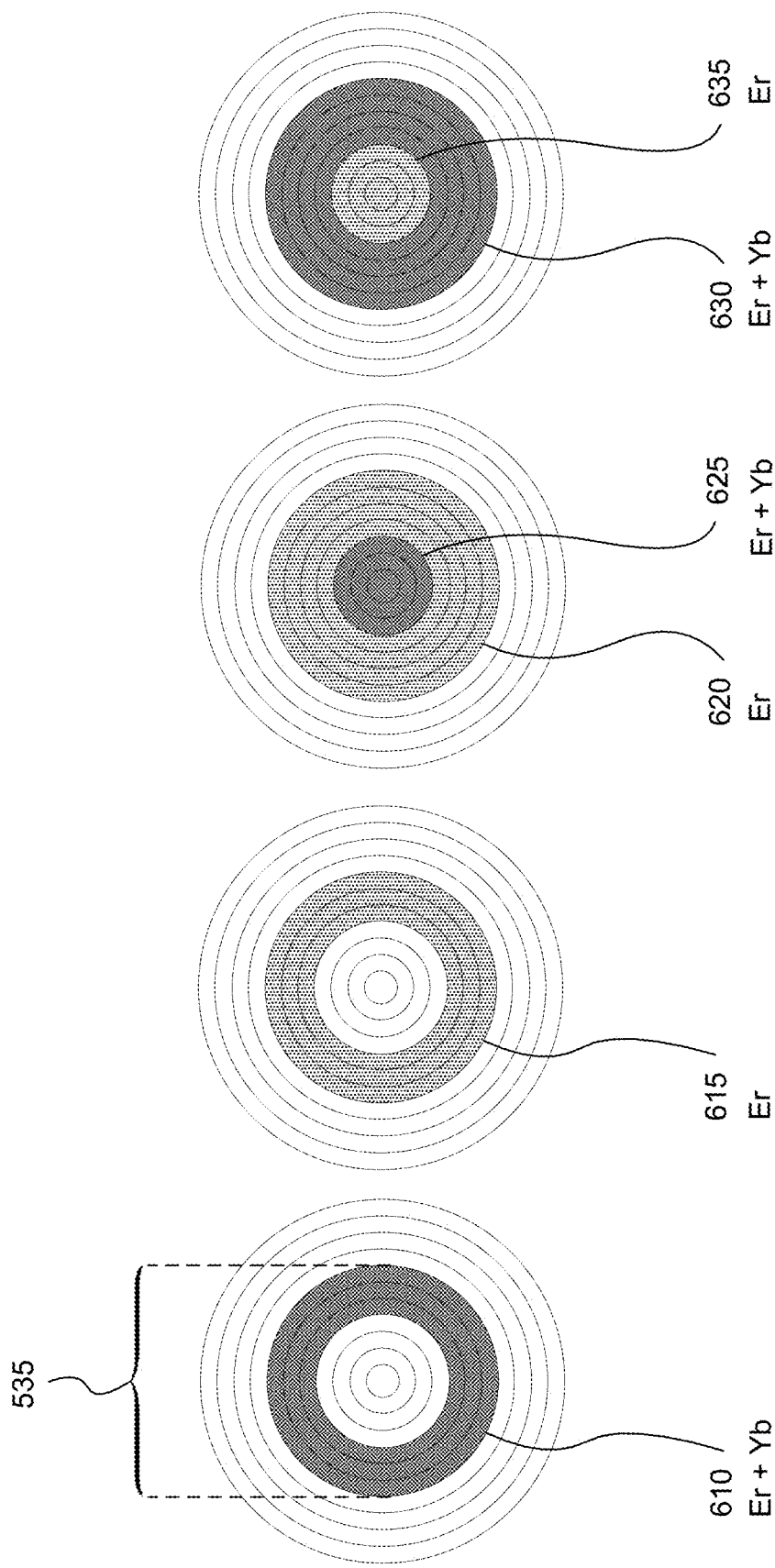

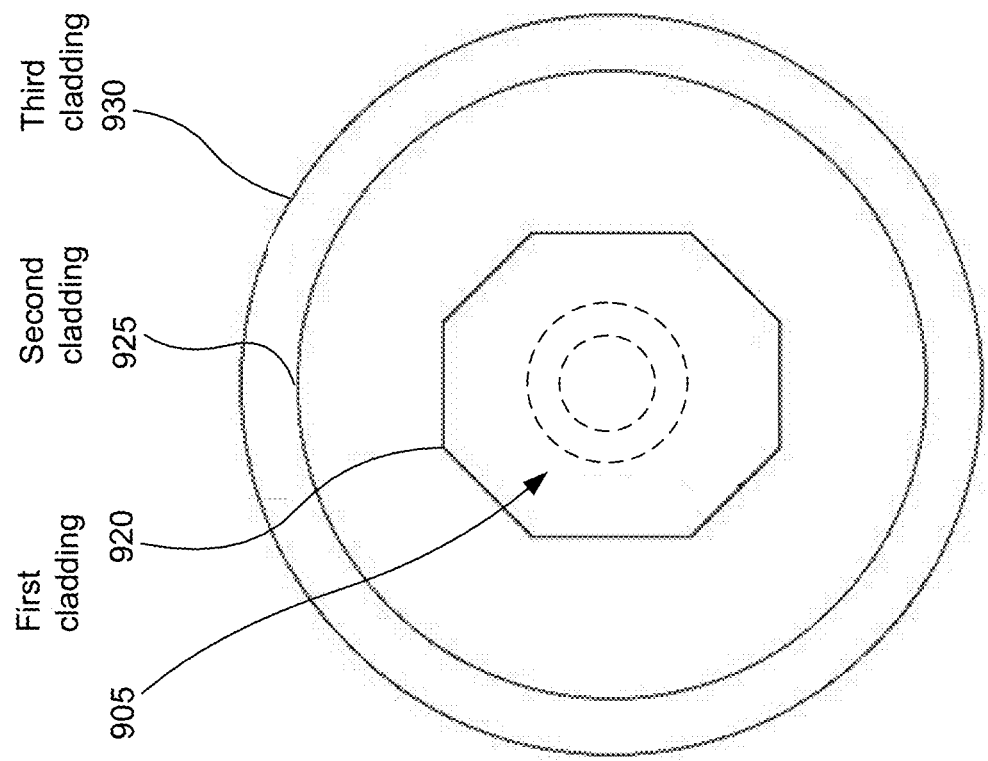
FIG. 9B Triple cladding
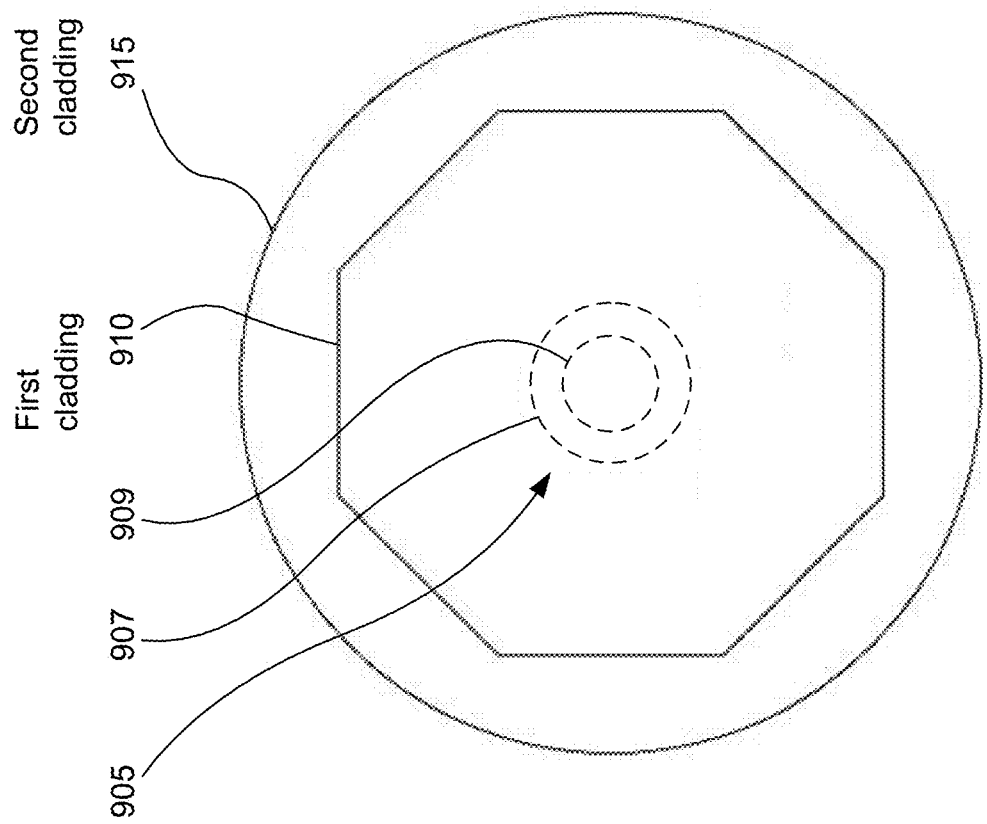
FIG. 9A Double cladding

SYSTEMS AND METHODS TO INCREASE PUMP CONVERSION EFFICIENCY OF AN OPTICAL FIBER

CROSS-REFERENCE TO RELATED APPLICATIONS

This is the first application filed for the present invention.

FIELD

This disclosure pertains generally to the field of optical devices and in particular, to systems and methods for increasing the pumping conversion efficiency in an optical fiber.

BACKGROUND

In order to minimize the cost per bit in optical fiber communications, the fiber amplifiers of an optical fiber system need to be compact and low cost. In erbium (Er) doped fiber amplifiers (EDFAs) of the prior art, single-mode (SM) semiconductor pump diodes are typically used to provide the energy needed to amplify fiber signals. Most of an amplifier's total cost (eg. approximately 60%) is due to the SM pump diodes.

Another type of semiconductor pump diode that can be used however, is a multi-mode (MM) pump diode, which is widely used for high-power fiber lasers. An MM pump diode can deliver a much higher output power than a single mode pump diode, but with lower brightness (e.g. lower power density). In addition, a typical MM pump diode can typically be more cost effective than a single mode pump diode. The electrical-to-optical (E/O) conversion efficiency of an MM diode can be about two times that of an SM diode.

The introduction of an MM pumping source into an EDFA has the potential to lower the total cost of EDFAs. However, it has not been practical to use MM pump diodes together with erbium doped fibers (EDFs) of the prior art, because the absorption of MM pump light by erbium ions is very low. To overcome this problem, an erbium-ytterbium (Er—Yb) co-doped fiber (EYDF) was developed, where absorption is enhanced by having the fiber co-doped with both ytterbium ions and erbium ions.

In an EYDF, phosphor-silicate glass (e.g. phosphosilicate glass) can be used to increase the energy transfer from the Yb ions to the Er ions. It is understood that a phosphor-silicate glass host has a larger maximum phonon energy than other glass hosts. While spectroscopic properties of erbium ions in the phosphor-silicate glass of EYDFs are suitable for amplification of an L-band signal (e.g. 1565 nm to 1610 nm), a significant portion of the pumping power can be lost to amplified spontaneous emission (ASE) light in the C-band (e.g. 1525 nm to 1565 nm). When under MM pumping, the power lost to the C-band can be as much as several hundred milliwatts (mW), and this loss may represent most of the pumping light's energy, which may result in pushing an amplifier into saturation and limit its resulting pump conversion efficiency (PCE).

To improve the PCE of an EYDF amplifier (EYDFA), optimizations can be made by tuning its core size, cladding size and pumping wavelengths. These parameters, however, cannot be changed arbitrarily. For example, the core size is limited by the mode field diameter (MFD) matching the passive fiber with which it is spliced, the cladding size is limited by the mechanical properties of the silica glass from which it is made, and the pumping wavelengths are typically limited to the optical source products that are available (e.g. commercially).

While there have been some attempts at overcoming these issues, these solutions have problems including the required inclusion of extra devices, or limited impact on pump conversion efficiency. As such, there continues to be a need for systems and methods to obviate or mitigate one or more limitations in the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present disclosure is to provide an optical fiber configured for increasing the pump conversion efficiency of the optical fiber as well as systems and methods for increasing the pump conversion efficiency of an optical fiber.

An aspect of the disclosure provides for an optical fiber having a length and a cross section area. The cross-sectional area of the optical fiber includes a core area including a first active region and a second active region. The first active region doped with erbium ions and the second active region doped with erbium ions and ytterbium ions. The optical fiber further includes a cladding layer surrounding the core area.

In some embodiments, the first active region is surrounded by the second active region. In some embodiments, the second active region is surrounded by the first active region.

In some embodiments, the core area further comprises a passive region configured to separate the first active region and the second active region. In some embodiments, the passive region is formed from a material including but not limited to $GeO_2$—$SiO_2$, $Al_2O_3$—$SiO_2$, $P_2O_5$—$SiO_2$ and pure $SiO_2$.

In some embodiments, the core area further includes a passive region, the passive region surrounding an inner core area and the passive region surrounded by an outer core area, wherein the inner core is the first active region or the second active region and the outer core area is the other of the first active region or the second active region. In some embodiments, the first active region is positioned centrally in the core area and the second active region includes multiple separated regions positioned around the first active region, wherein the core area further includes a passive region separating each of the first active region and the multiple separated regions of the second active region.

In some embodiments, the cladding layer surrounding the core area has a non-circular shape and the cladding layer is surrounded by a second cladding layer. In some embodiments, the optical fiber further includes a third cladding layer surrounding the second cladding layer.

In some embodiments, the core area further comprises a third active region, a first passive region and a second passive region, the third active region doped with erbium ions, the first passive region surrounding the first active region which is centrally located within the cross-sectional area of the optical fiber, the second active region surrounding the first passive region, the second passive region surrounding the second active region and the third active region surrounding the second passive region. In some embodiments, the core area further comprises a third active region and a fourth active region, the third active region doped with erbium ions and the fourth active region doped with erbium ions and ytterbium ions, the first active region is centrally located in the cross-sectional area of the optical fiber, the first active region surrounded by the second active region, the second active region surrounded by the third active region and the third active region surrounded by the fourth active region.

An aspect of the disclosure provides for a method for increasing optical pump conversion efficiency (PCE) for an optical fiber pumped by a multi-mode pump diode. The optical fiber including a first active region and a second active region, the first active region doped with erbium ions and the second active region doped with erbium ions and ytterbium ions, the optical fiber further including a cladding layer surrounding the core area. The method includes receiving, by the optical fiber, optical wavelengths from the multi-mode pump diode and absorbing, by the second active region, a spectrum of optical wavelengths. The method further includes absorbing, by the first active region, optical wavelengths in a C-band and emitting, by both the first active region and the second active region, optical wavelengths in the L-band, via stimulated emission.

An aspect of the disclosure provides a system for amplifying an L-band signal. The system includes a source of multimode pumping light and a signal-pump combiner optically coupled to the source. The system further includes an optical fiber optically coupled to the source and signal-pump combiner, the optical fiber including a first active region and a second active region, the first active region doped with erbium ions and the second active region doped with erbium ions and ytterbium ions, the optical fiber further including a cladding layer surrounding the core area.

In some embodiments, the system further includes a splitter directing multimode light from the source to the signal-pump combiner. In some embodiments, the system further includes a source of single mode light providing optical wavelengths to the signal-pump combiner.

A technical advantage of the present disclosure may be the increase of pump conversion efficiency for an optical fiber pumped by a multi-mode pump diode.

Embodiments have been described above in conjunctions with aspects of the present disclosure upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE DRAWINGS

FIG. 6A illustrates a cross-section of an optical fiber having an outer core co-doped with both Er and Yb (e.g. core type A).

FIG. 6B illustrates a cross-section of an optical fiber having an outer core doped with Er (e.g. core type B).

FIG. 6C illustrates a cross-section of a hybrid EY doped optical fiber having an outer core doped with Er, and an inner core co-doped with Er and Yb (e.g. core type C), according to an embodiment.

FIG. 6D illustrates a cross-section of a hybrid EY doped optical fiber having an outer core co-doped with Er and Yb, and an inner core doped with Er (e.g. core type D), according to an embodiment.

FIG. 9A illustrates a cross-section of a hybrid EY doped optical fiber having a double cladding, according to an embodiment.

FIG. 9B illustrates a cross-section of a hybrid EY doped optical fiber having a triple cladding, according to an embodiment.

It will be noted that throughout the appended drawings, like features are identified by like reference numerals.

DETAILED DESCRIPTION

Embodiments of the present disclosure an optical fiber that includes an active region having a hybrid of doped fibers therein. According to some embodiments, there is provided an optical fiber having a hybrid active region including erbium-ytterbium doped fibers, which can be referred to as a hybrid EY doped optical fiber. In particular, an optical fiber according to an embodiment can have an active region including two or more core regions, wherein one core region is doped with erbium (Er), and another core region is co-doped with both erbium (Er) and ytterbium (Yb). In such a structure, there can be an intrinsic limit as to the maximum number of erbium ions in the excited state (e.g. inversion level) along the length of the optical fiber. This maximum number of Er ions can result in reducing the build-up of amplified spontaneous emission (ASE) in the C-band, thereby reducing losses through C-band ASE. According to embodiments, simulation results can show that the PCE of optical fibers designed according to embodiments of the present disclosure can be improved by approximately 30%.

Compared to a single mode pump diode, a multi-mode (MM) pump diode is generally more cost effective and a MM pump's electrical-to-optical (E/O) conversion efficiency can be greater by a factor of two.

Figure 1:
FIG. 1 is a table comparing costs of power from a single mode fiber amplifier pump diode and from a multimode fiber amplifier pump diode.

FIG. 1 is a table comparing costs of power from a single mode fiber amplifier pump and from a multimode fiber amplifier pump. For a multimode pump, the electro-optic conversion efficiency 110 is typically greater at 29% than for a single mode pump, and at 7 dollars per Watt instead of 250 dollars per Watt, the cost is also less 120.

In an erbium ytterbium doped fiber amplifier (EYDFA), the injection of high-power MM pump light can lead to many erbium ions being excited to a higher energy level. This can be referred to as a strong population inversion of the erbium ions. Consequently, backward amplified spontaneous emission (ASE) in the C-band can build up, especially in a region having a high erbium ion inversion level. FIGS. 2A to 2F show typical simulation results of a single-stage EYDFA.

Figure 2A:
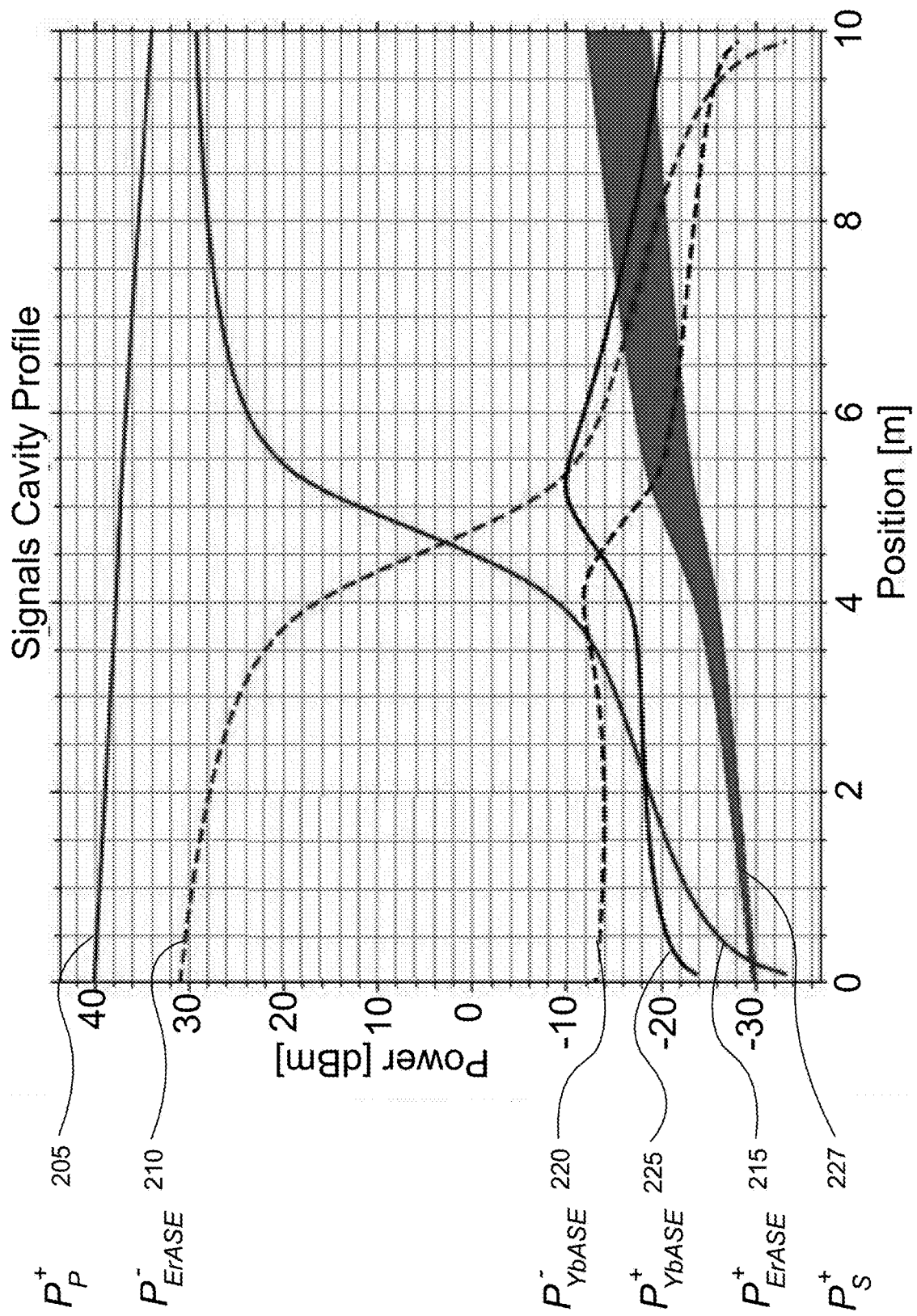
FIG. 2A is a graph showing how, in a single-stage co-directional pumped EYDFA, different lights can be distributed along the optical fiber.

FIG. 2A is a graph showing how the power of pump light can be distributed among the Er and Yb ions along a single-stage EYDFA, according to results where a pumping light source is located at an optical fiber end (e.g. position 0 m). $P_P^+$ is the co-propagating pump light, $P_{ErASE}^+$ and $P_{ErASE}^-$ are the co- and counter-propagating ASE light generated by the erbium ions, $P_{YbASE}^+$ and $P_{YbASE}^-$ are the co- and counter-propagating ASE light generated by the ytterbium ions, $P_S^+$ is the co-propagating signal light. The pump power in the forward direction $P_P^+$; along the length of the optical fiber can be nearly constant or have a slight drop, for the first 10 meters 205. The power consumed by backward C-band ASE, $P_{ErASE}^-$ 210, can build up at the position where the Er population inversion is high, while forward C-band ASE $P_{ErASE}^+$ 215 builds up further along the length of the optical fiber. This ASE build up can occur because a high pumping power can cause a high peak value for Er population inversion. For Yb ions, ASE is less, whether in the backward $P_{YbASE}^-$ 220 or forward $P_{YbASE}^+$ 225 direction. The overall result is a signal power $P_S^+$ 227 that increases (i.e. is amplified) along the length of the optical fiber.

Figure 2B:
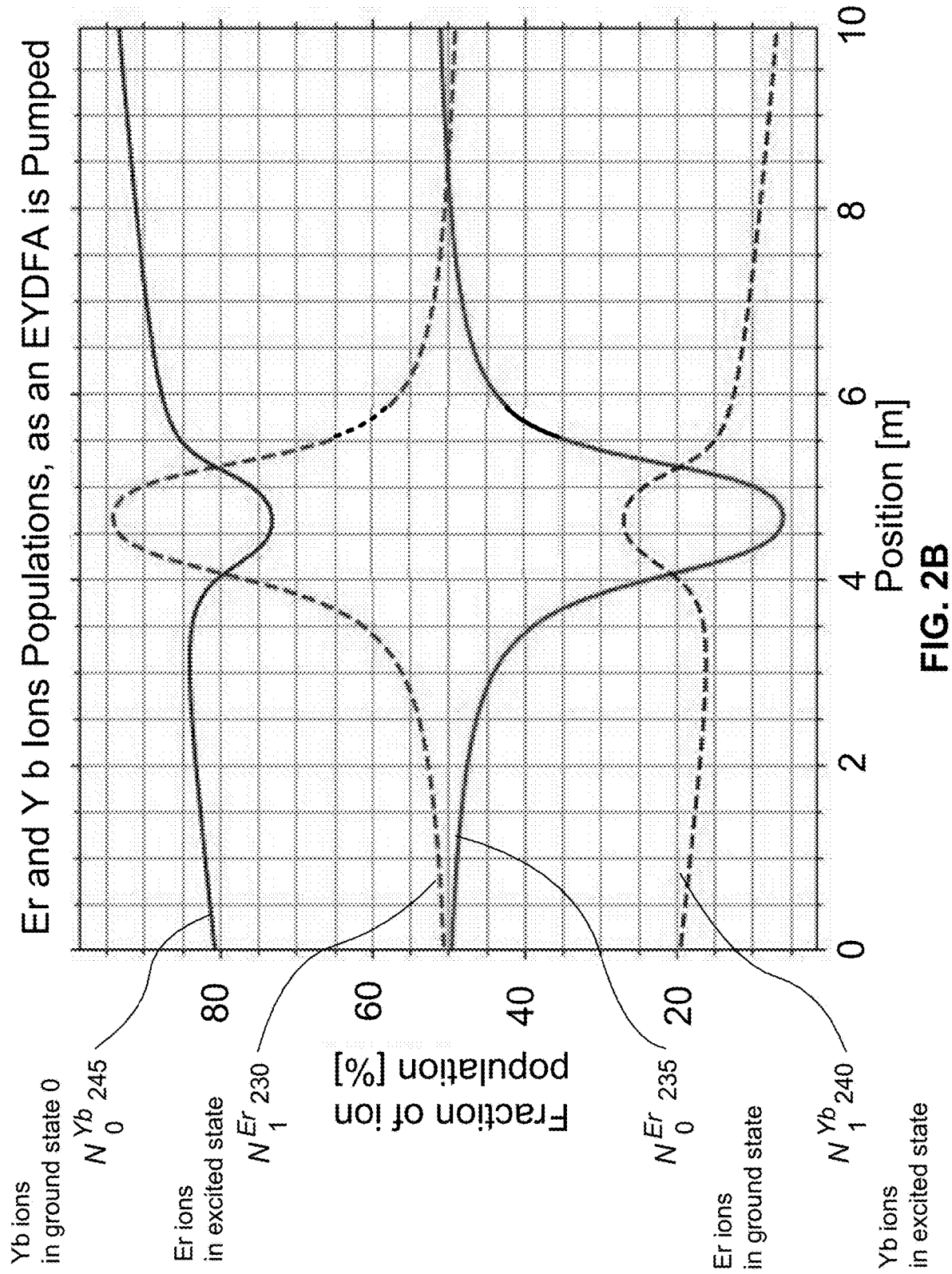
FIG. 2B is a graph showing the fraction of Er and Yb ions that are pumped to their excited energy levels, along the length of a single-stage EYDFA.

FIG. 2B is a graph showing the fraction of Er and Yb ions that are pumped to their excited energy levels, along the length of a single-stage EYDFA. The fraction of Er ions in their excited state $N_1^{Er}$ 230 has a peak at around 4.7 m, which corresponds to the lower number of Er ions at their ground state $N_0^{Er}$ 235. This position along the length of the optical fiber also corresponds to where the backward 210 and forward 215 C-band ASEs from Er quickly build up, as shown in FIG. 2A. For Yb ions, the curves for the excited state population $N_1^{Yb}$ 240 and the ground state population $N_0^{Yb}$ 245 have similar shapes, but with lower variation. Because most of the pumping power may be converted into C-band ASE, rather than into L-band signal power, improving the PCE of an EYDFA may be provided by reducing C-band ASE from Er, by controlling the fraction of Er ions in their excited state $N_1^{Er}$ 230, e.g. to control the Er inversion level.

Figure 2C:
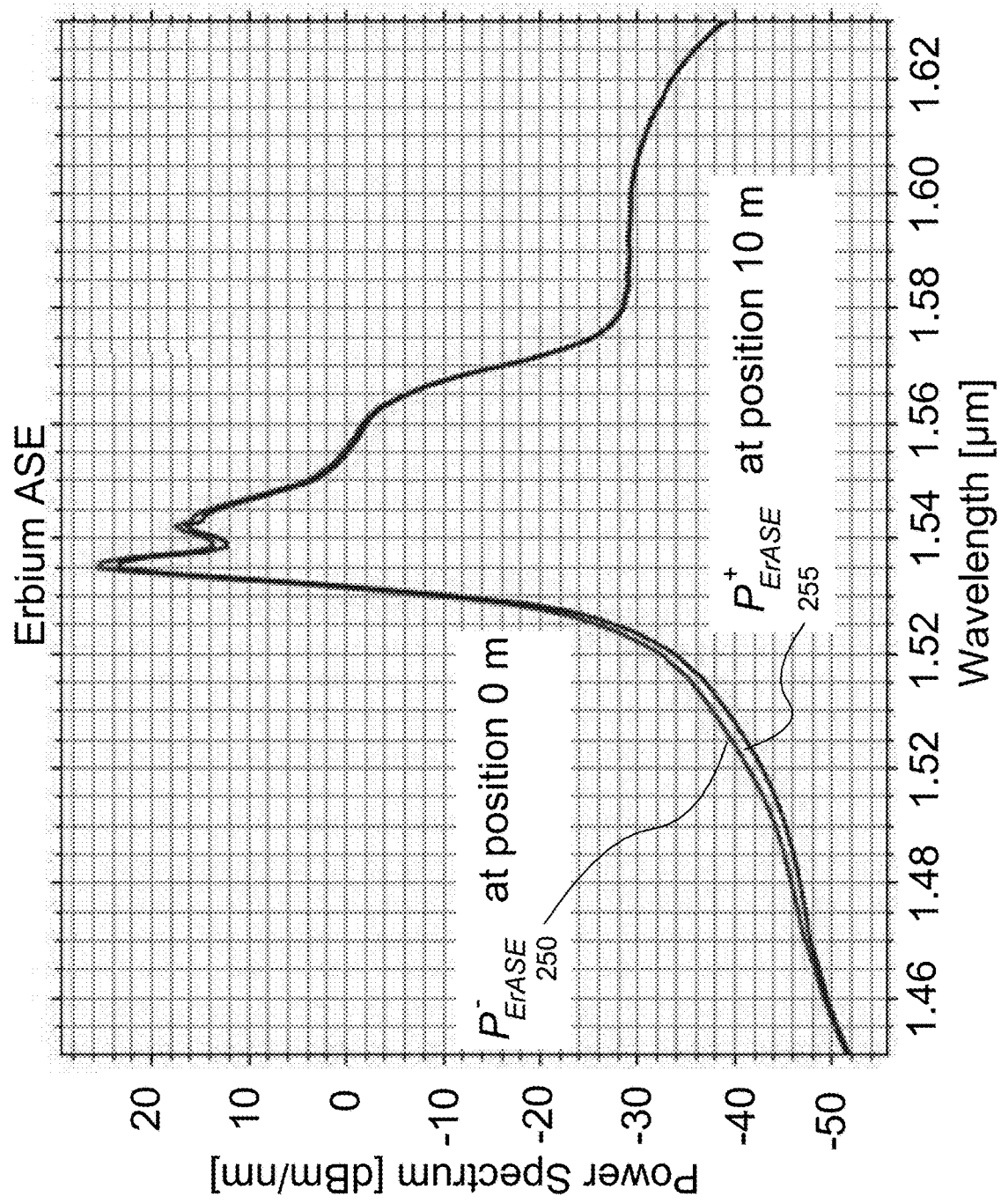
FIG. 2C is the power spectrum of amplified spontaneous emission (ASE) for Er ions in an EYDFA.

FIG. 2C is a graph showing the power spectrums of amplified spontaneous emission (ASE) from Er ions in an EYDFA. When measured far from the Er emission sources, the ASE power spectrums from Er ions are substantially the same in both directions of propagation along an EYDFA: the negative direction $P_{ErASE}^-$ at position 0 m 250, and the positive direction $P_{ErASE}^+$ at position 10 m 255.

Figure 2D:
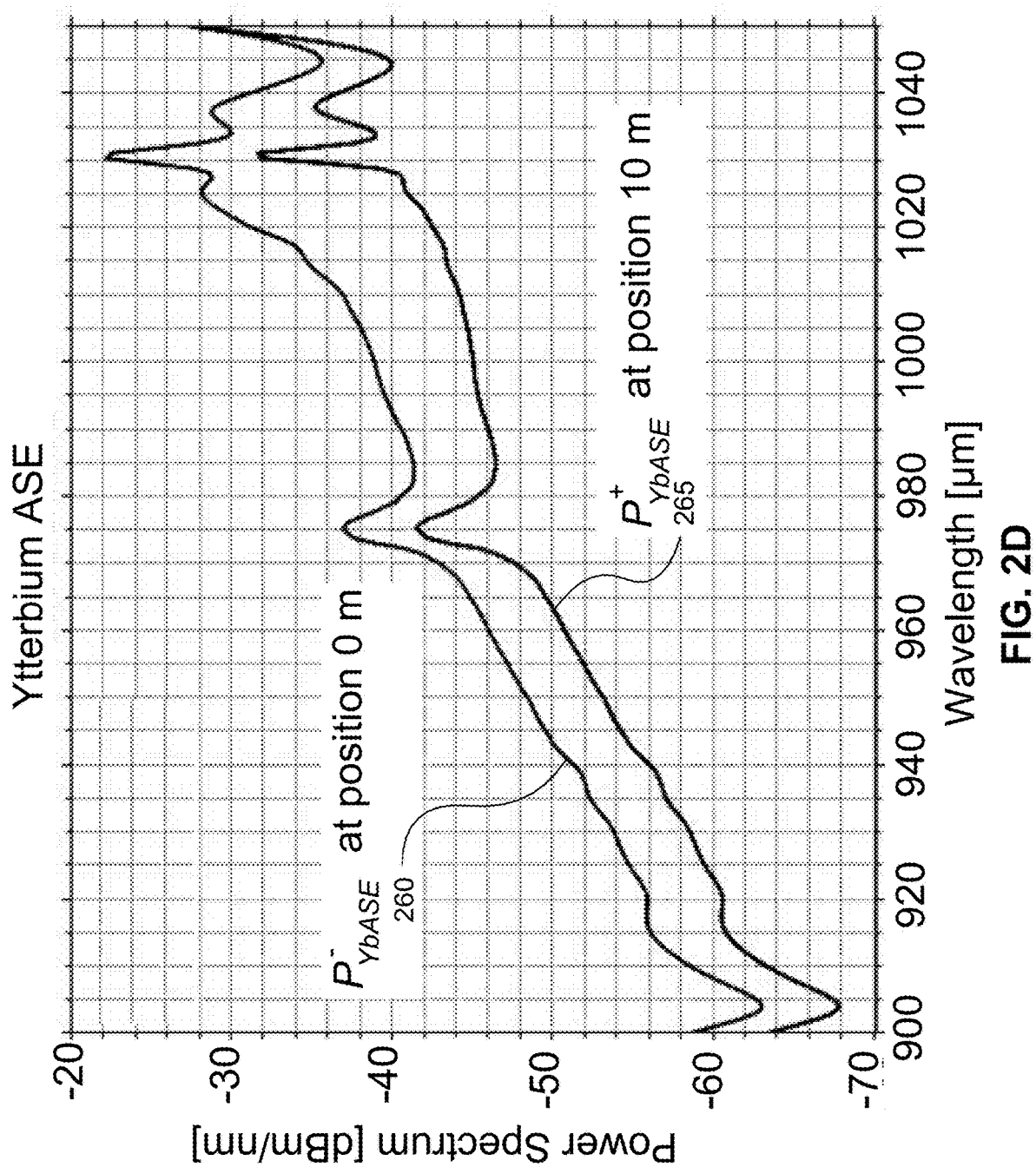
FIG. 2D is the power spectrum of amplified spontaneous emission (ASE) for Yb ions in an EYDFA.

FIG. 2D is a graph showing the power spectrums of amplified spontaneous emission (ASE) from Yb ions in an EYDFA. The graph shows that ASE from Yb ions in the negative direction $P_{YbASE}^-$ at position 0 m 260 is slightly higher than ASE from Yb ions in the positive direction $P_{YbASE}^+$ at position 0 m 265.

Figure 2E:
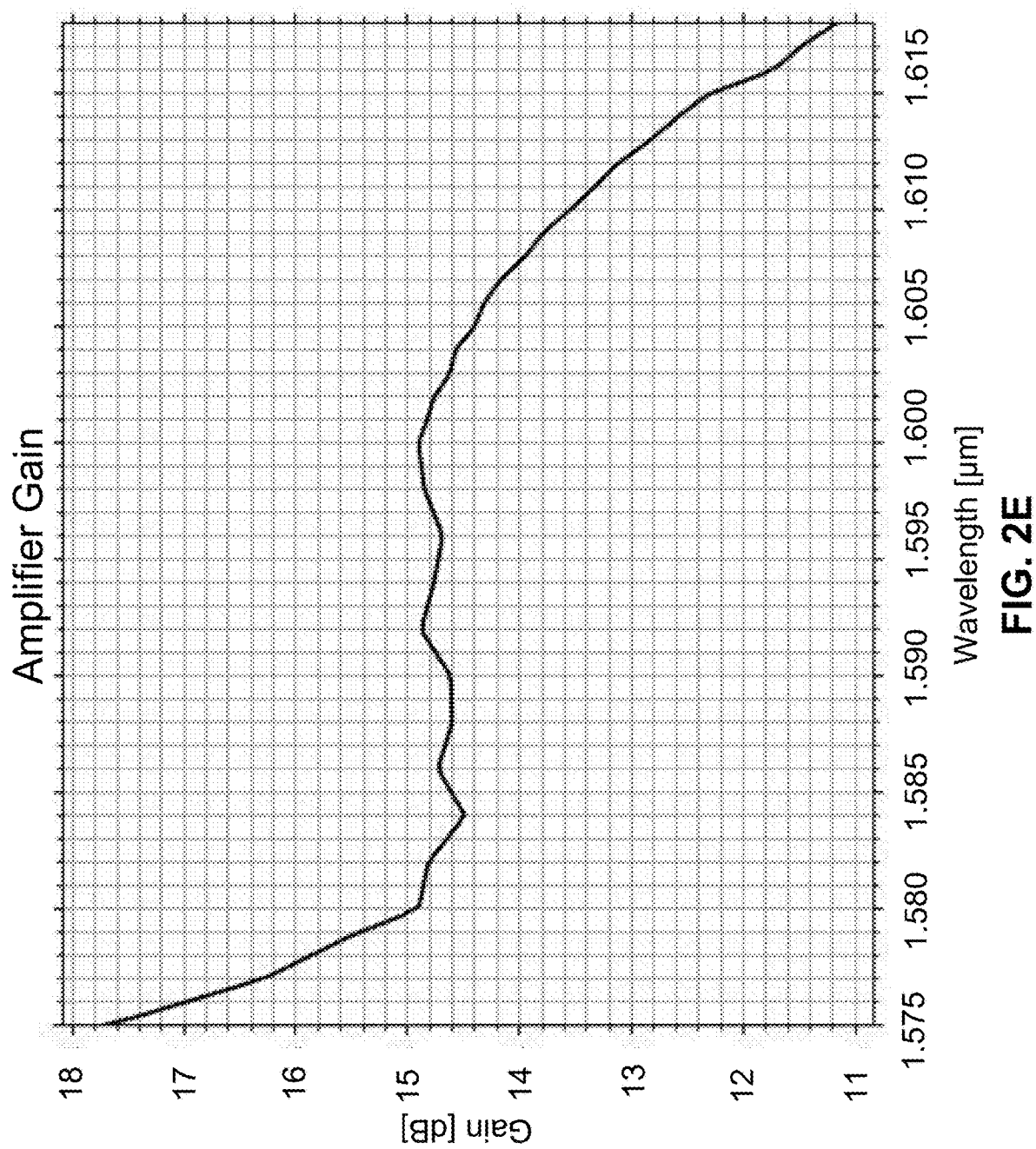
FIG. 2E is a graph showing the spectrum of amplifier gain in an EYDFA.

FIG. 2E is a graph showing the spectrum of amplifier gain in an EYDFA.

Figure 2F:
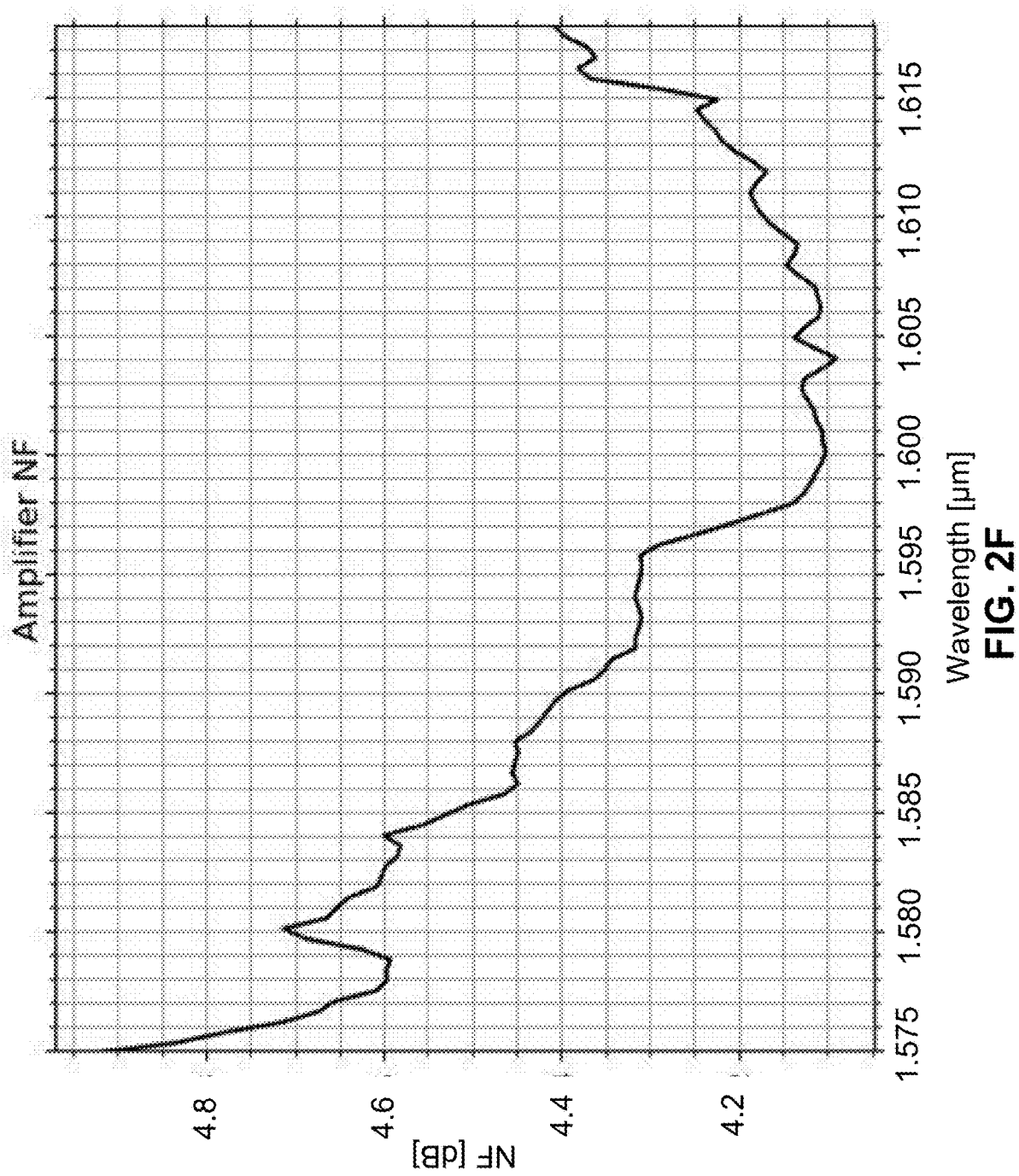
FIG. 2F is a graph showing the noise figure spectrum in an EYDFA.

FIG. 2F is a graph showing the spectrum of the noise figure in an EYDFA.

According to an embodiment, the core of an optical fiber can contain at least two regions including an inner core and an outer core, and the two regions can be concentric, such that the outer core forms a layer around the inner core. One region can be doped with erbium (Er) ions, and the other region can be co-doped with both erbium (Er) ions and ytterbium (Yb) ions.

In an embodiment, an inner core can be Er-doped and an outer core can be co-doped with Er and Yb, and in another embodiment, an inner core can be co-doped with Er and Yb, and an outer core can be Er-doped.

In embodiments, an optical fiber can have a cladding structure allowing transmission and usage of multimode pumping light. Pumping light can contain optical wavelengths including a spectrum of optical wavelengths encompassing an optical wavelength of 915 nm, and when such light is received by the fiber, the region co-doped with both Er and Yb can absorb and be directly affected by the pumping light, while other regions of the fiber can be minimally affected, or not significantly affected. A region where Er ions are not co-doped with Yb ions does not necessarily interact with pumping light directly, but it can absorb the C-band amplifier-spontaneous emission (ASE) generated by those Er ions that are co-doped with Yb. In other words, a region doped with Er ions can act as a local absorber for C-band ASE generated from the region co-doped with Er and Yb ions. While such absorption is taking place, the region doped with Er ions may provide gain to one or more L-band signals.

Figure 3:
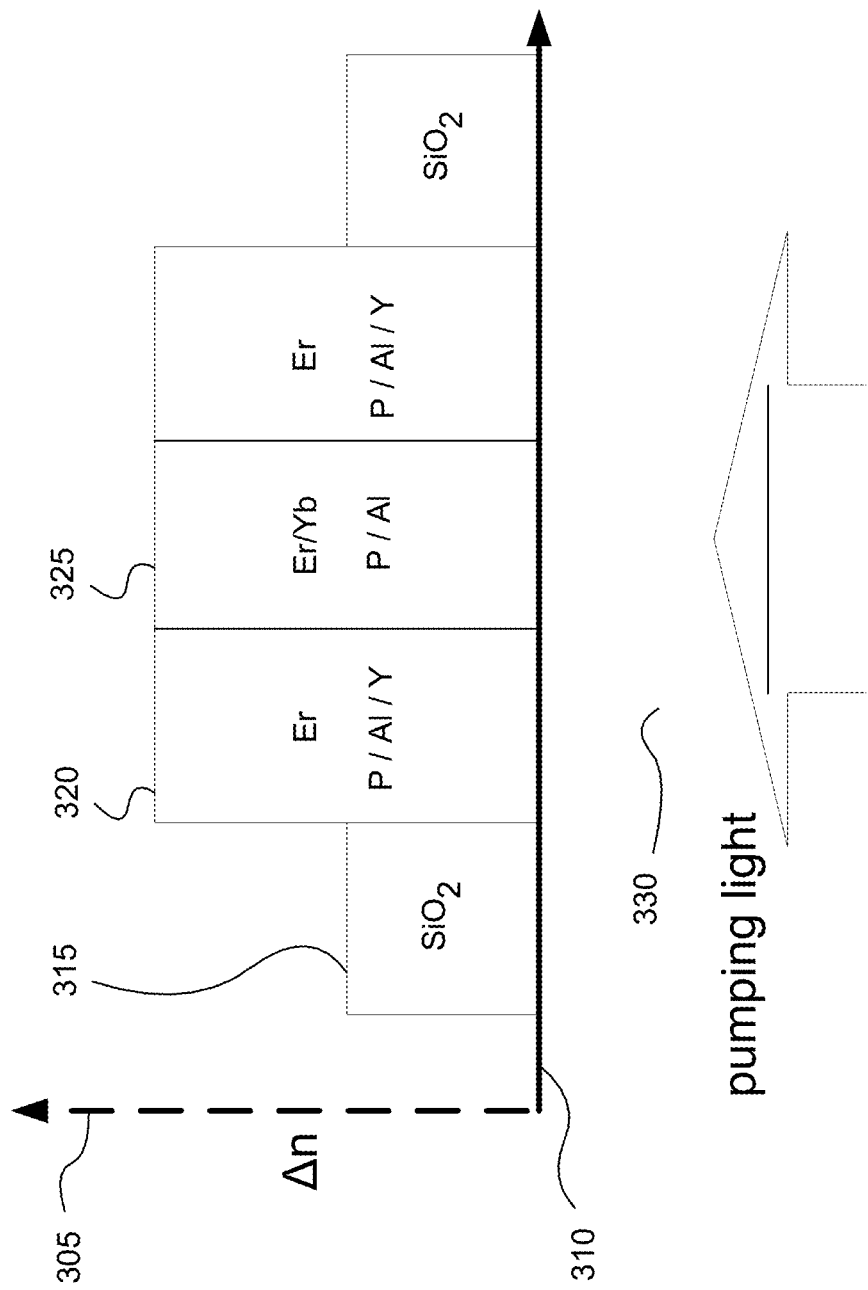
FIG. 3 illustrates a configuration of optical fiber materials for a hybrid erbium-ytterbium doped optical fiber (hybrid EY doped fiber), according to an embodiment.

FIG. 3 illustrates a configuration of optical fiber materials, according to an embodiment. The x-axis 310 is a line along the diameter of an optical fiber, while the y-axis 305 represents the difference in refractive index Δn with that of an arbitrary external medium (e.g. air). Both axes are in arbitrary units. A cladding can be structured as one or more layers and can be transparent to 915 nm. It can include silica (e.g. silicon dioxide or $SiO_2$) 315. A core can be made of two or more regions, including an outer core and an inner core. An outer silica core can be doped with Er ions 320, including other co-dopants such as phosphorus, aluminum, germanium, yttrium, gadolinium, cerium, and the like, and an inner region of the core can be doped with both Er and Yb ions 325, including other co-dopants such as phosphorus, aluminum, germanium, yttrium, gadolinium, cerium, and the like. In some embodiments, absorption of 915 nm pumping light can be mostly due to $Yb^{3+}$ ions in a region co-doped with Er and Yb ions 325, while a maximum inversion level can be determined by the amount of $Er^{3+}$ ions in a region doped with Er only 320.

To pump the active core regions of an optical fiber according to an embodiment, a source of 915 nm pumping light 330 can be used through a cladding structure, via end-coupling or side-coupling of the optical fiber. It will be readily understood that while 915 nm light is defined this light can have a frequency range of approximately between 870 nm to 960 nm.

With an embodiment having an inner core doped with Er and an outer core co-doped with Er and Yb, the fraction of Er ions that can be pumped to an excited state, e.g. the population inversion of Er, can depend on their location along the fiber. It is noted that by modifying the size of an Er doped region, the capability of a fiber to absorb C-band ASE can be controlled. For example, the larger the Er doped region, the lower the maximum Er inversion level that can be achieved along the fiber. In other words, by increasing the volume of an Er doped region, the maximum Er inversion level can be decreased.

If a maximum Er inversion level is fixed or limited (e.g. "clamped"), less C-band ASE can be generated. As a result, more of the pumping power can be used for an L-band signal, thereby increasing the PCE. In other words, more of the pumping power can be converted into L-band power.

A lower averaged Er inversion level can cause the noise figure (NF) of an EYDFA to be degraded. However, if an EYDFA according to an embodiment is used in power booster stages of an optical fiber network, this may not be a significant issue, because a NF is mostly dependent on a pre-amplification stage, where single mode (SM) pumping can be used instead of MM pumping. This aspect can be illustrated using an expression of the NF for a cascaded amplifier as defined for example in Equation 1.

$$NF_{total} = NF_{stage1} + \frac{NF_{stage2}}{Gain_{stage1}} + \frac{NF_{stage3}}{Gain_{stage1} \times Gain_{stage2}} + \frac{NF_{stage34}}{Gain_{stage1} \times Gain_{stage2} \times Gain_{stage3}} \quad (1)$$

Figure 4A:
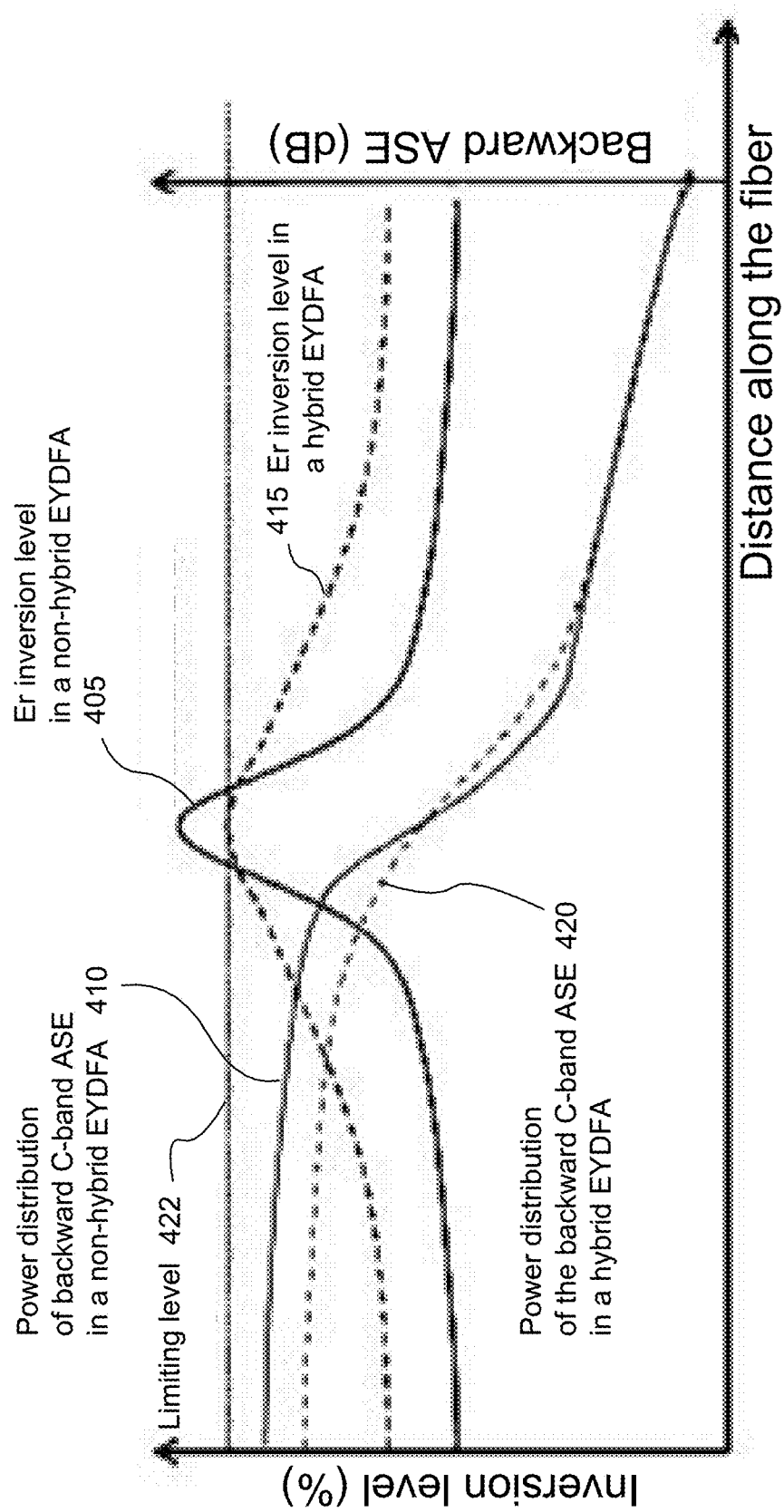
FIG. 4A is a graph showing backward C-band ASE of Er, along a hybrid EY doped optical fiber according to an embodiment.

FIG. 4A is a graph showing the inversion level of Er ions and backward C-band ASE of Er, along a hybrid EYDFA according to an embodiment, for example as illustrated in FIG. 3. For a non-hybrid EYDFA, there can be a peak Er inversion level 405 at a certain point along the fiber, and the power distribution of backward-propagated C-band ASE 410 can be high near the signal source. In a hybrid EYDFA however, the peak Er inversion level 415 can be lower, the Er inversion can be more evenly distributed along the fiber, and the output power of the back-propagated C-band ASE 420 can be lower. The maximum Er inversion level can be a limiting level 422 that can be set when selecting the size and volume of an Er doped region.

Figure 4B:
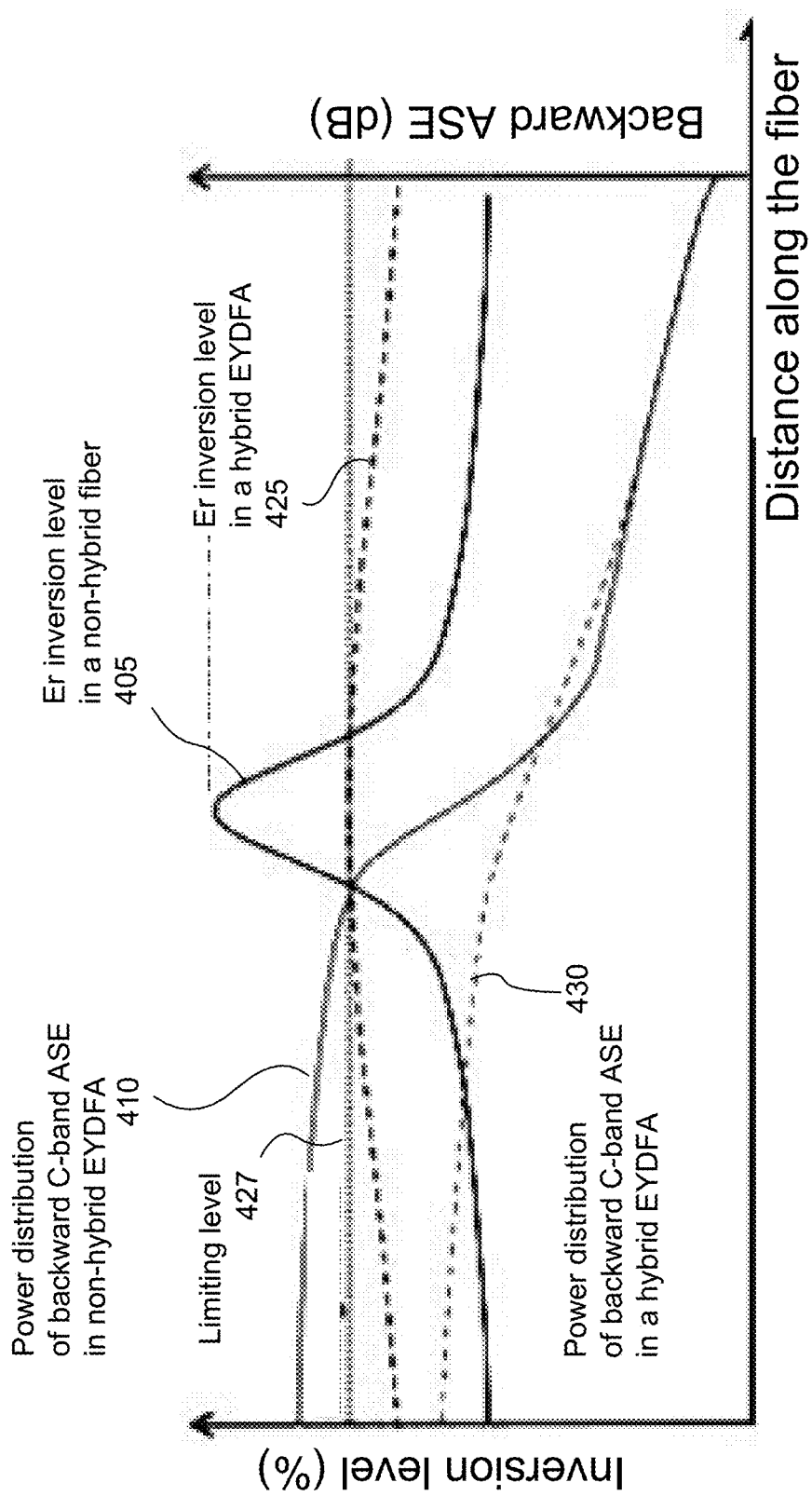
FIG. 4B is a graph showing backward C-band ASE of Er, along a hybrid EY doped optical fiber according to an embodiment, wherein the Er doped region is larger in diameter than that used in FIG. 4A.

FIG. 4B is a graph showing the inversion level of Er ions and backward C-band ASE of Er, along a hybrid EYDFA according to an embodiment where an Er doped region is larger in diameter and volume than it is in FIG. 4A. In this example, the Er doped region of a hybrid EY doped optical fiber is larger in diameter than in the hybrid EY doped optical fiber of FIG. 4A and therefore, the peak Er inversion level 425 is lower, and the output power of backward C-band ASE 430 is lower. This graph demonstrates how the amount of backward C-band ASE can be controlled. The maximum Er inversion level is a limiting level 427 that can depend on the size of the Er doped region.

Figure 4C:
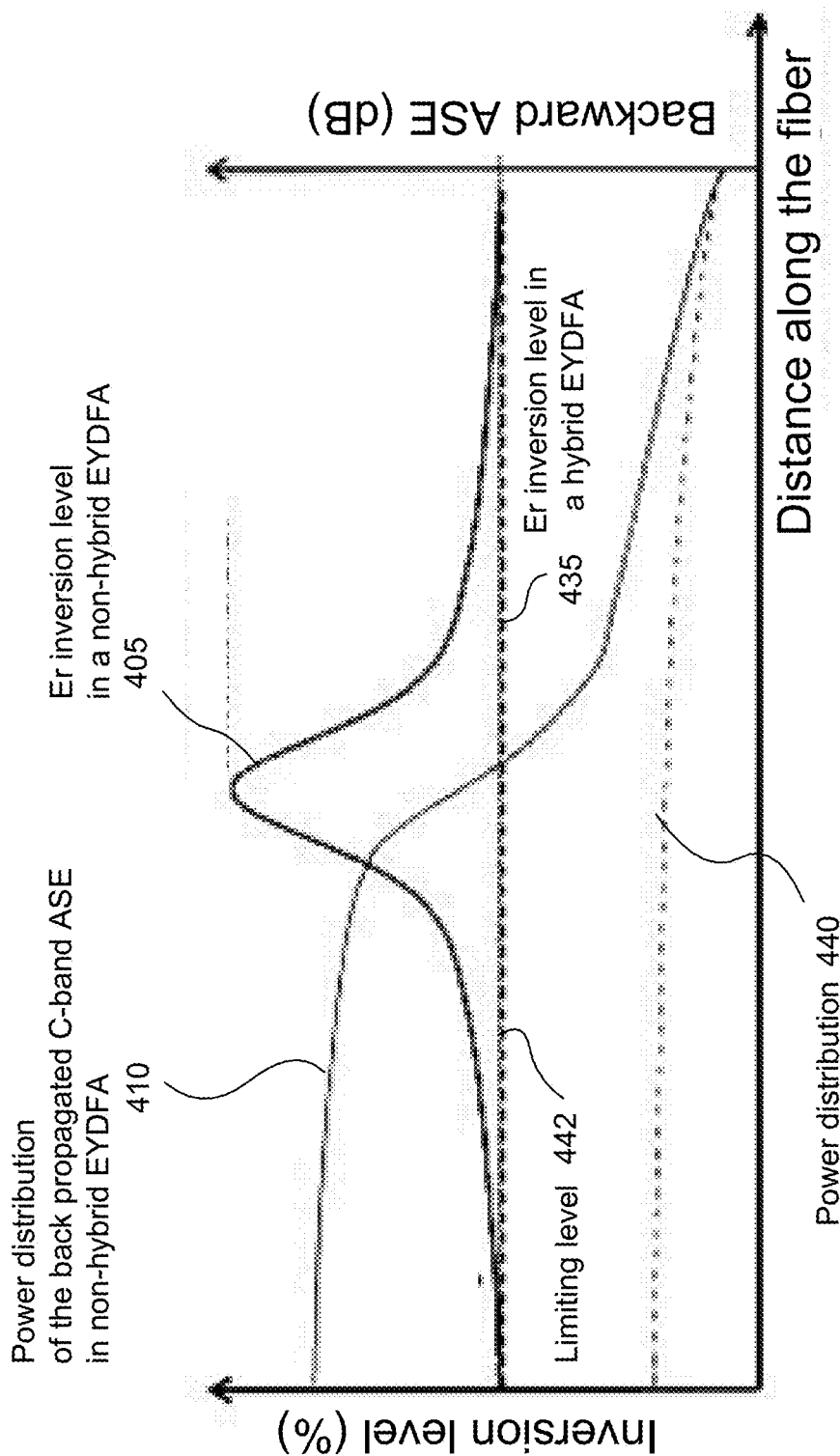
FIG. 4C is a graph showing backward C-band ASE of Er, along a hybrid EY doped optical fiber according to an embodiment, wherein the Er doped region is larger in diameter than that used in in FIGS. 4A and 4B.

FIG. 4C is a graph showing the inversion level of Er ions and the backward C-band ASE of Er, along a hybrid EY doped optical fiber according to an embodiment where an Er doped region is larger in diameter and volume than in FIG. 4A and FIG. 4B. In this example, the Er inversion level 435 distribution is even flatter along the fiber than in FIG. 4B, and the output power of the backward C-band ASE 440 becomes very low, because the Er doped region is larger in volume. This demonstrates how backward C-band ASE 440 can be reduced by increasing the volume of an Er doped region, even more than in FIG. 4B. Again, a maximum Er inversion level is a limiting level 442 that can depend on the size and volume of an Er doped region.

In an embodiment, a hybrid EY doped optical fiber, having a core of step-index refractive index profile, is simulated. For the ease of numerical calculation, the fiber core is divided into approximately one hundred concentric sections, each one being either doped with Er, or co-doped with Er and Yb. A single stage amplifier structure can be used to provide input signal powers from 5 dBm to 13 dBm, and pumping power can be either 3 W or 5 W. A gain flattening filter (GFF) can be placed after the amplifier to flatten the gain spectrum, and a PCE can be calculated after the GFF operation. This case can be regarded as a "worst-case" scenario, for estimating the PCE improvement of a hybrid EY doped optical fiber according to an embodiment, and comparing with a PCE of current optical configurations.

Figure 5:
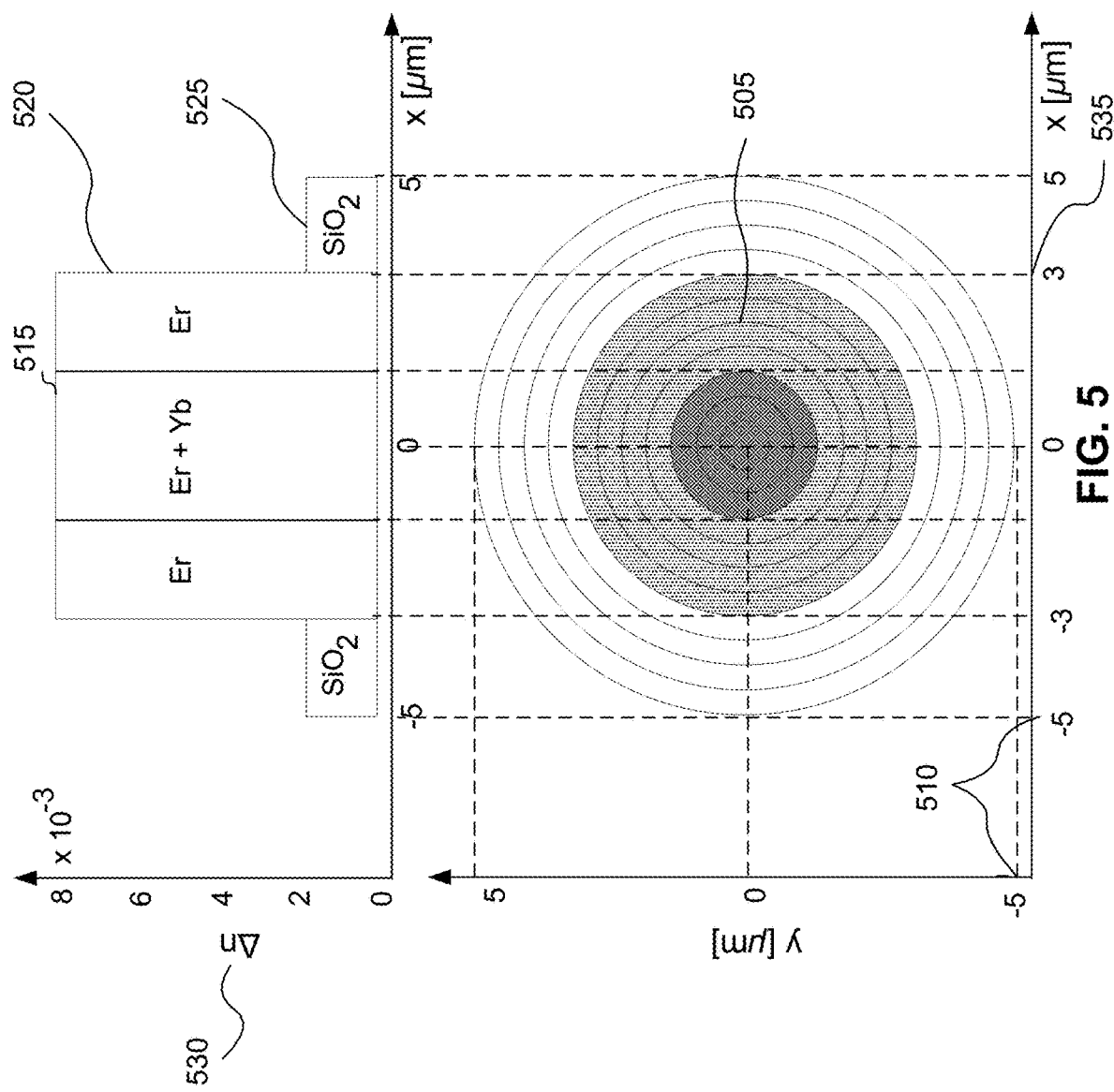
FIG. 5 illustrates a cross-section of a hybrid EY doped optical fiber according to an embodiment, and the refractive index of each material, as a difference with that of the external medium.

FIG. 5 illustrates a cross-section of a hybrid EY doped optical fiber according to an embodiment, and the schematic diagram of the refractive index profile together with the information of the key materials. A step-index fiber core can be divided into approximately one hundred concentric regions 505, each one doped either with Er or with both Er and Yb, and cladding layers can be added, making for a total radius of approximately 5 μm 510. In accordance with an embodiment, a hybrid EY doped optical fiber can be made of three different layers: an inner core doped with Er+Yb 515, an outer core doped with Er 520, and a cladding which is pure $SiO_2$ 525. In order to raise the refractive index $\Delta n$ 530 in the core region, the inner core 515 and the outer core 520 can be doped with materials such as the phosphorus, aluminum, germanium, yttrium, and the like.

According to embodiments, a hybrid EY doped optical fiber can have four types of active core regions, each one having an outer core radius of 3 μm 535, allowing mode field diameter (MFD) to match with many common passive fibers. The diameter of each inner core can be selected to optimize PCE.

FIGS. 6A to 6D illustrate cross-sections for four types of optical fibers, according to embodiments. According to some embodiments, the outer core of each fiber can be fixed at 3 μm.

FIG. 6A illustrates a cross-section of an optical fiber having an outer core co-doped with both Er and Yb 610, here referred to as core type A.

FIG. 6B illustrates a cross-section of an optical fiber having an outer core doped with Er 615, here referred to as core type B.

FIG. 6C illustrates a cross-section of a hybrid EY doped optical fiber having an outer core doped with Er 620, and an inner core co-doped with Er and Yb 625, here referred to as core type C, according to a simulated embodiment.

FIG. 6D illustrates a cross-section of a hybrid EY doped optical fiber having an outer core co-doped with Er and Yb 630, and an inner core doped with Er 635, here referred to as core type D, according to a simulated embodiment.

According to simulation results with embodiments having a hybrid design and a pumping power of 5 W, there can be an optimal size for an inner core where the PCE improvement over a non-hybrid design can be as high as 27%.

Figure 7A:
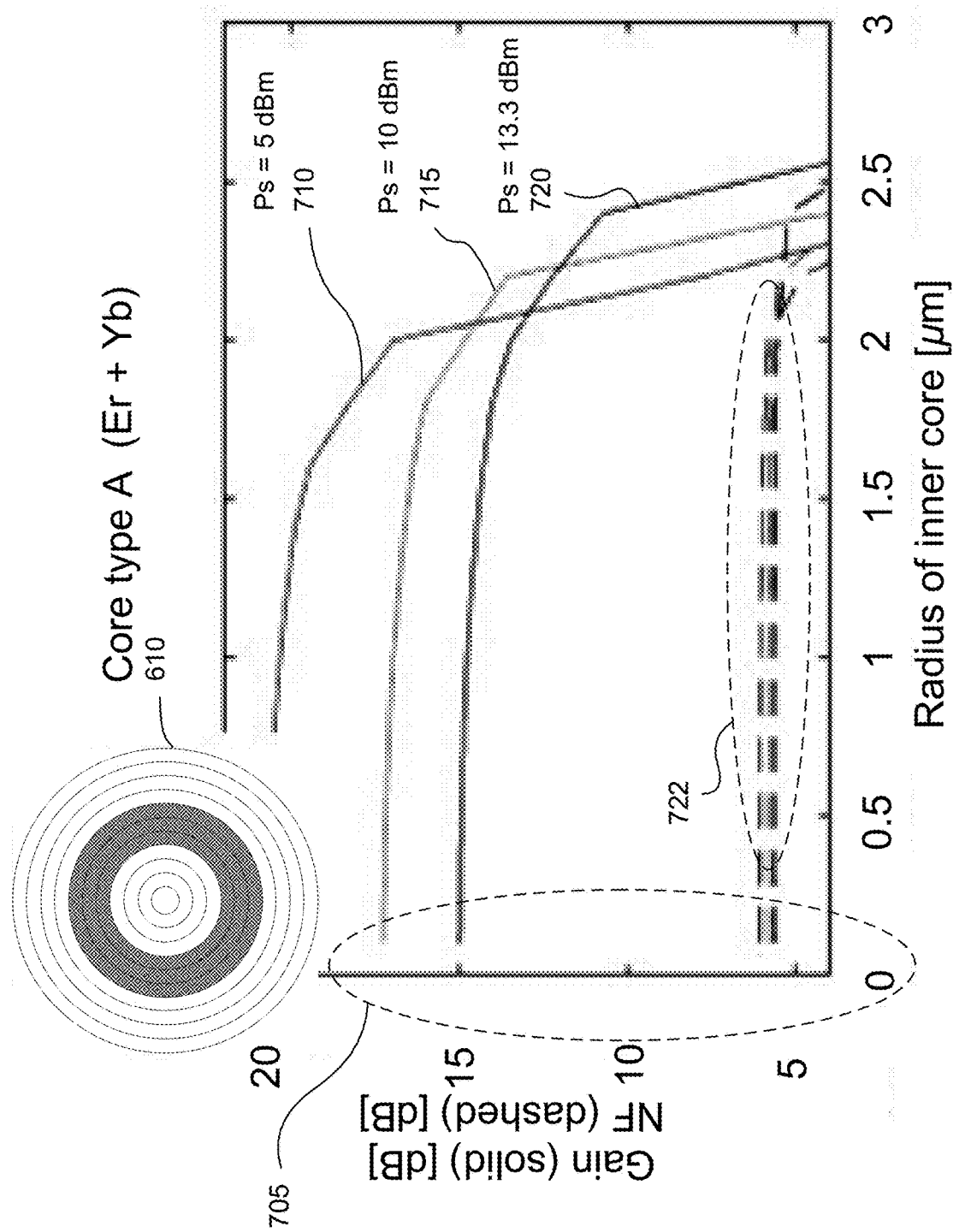
FIG. 7A is a graph showing amplification results wherein a 3 W light is pumping an optical fiber having an outer core doped with both Er and Yb (core type A).

FIG. 7A is a graph showing amplification with a 3 W MM pump light, of a signal in an optical fiber having an outer core doped with both Er and Yb (core type A). Simulation results show that the gains in power are approximately 15 dB to 20 dB, and the greatest gain in power is obtained with an inner core diameter of 0 μm 705, regardless of the signal's input power (Ps), which in this simulation is set to either one of Ps=5 dBm 710, Ps=10 dBm 715 and Ps=13.3 dBm 720. For any Ps, the noise figure (NF) 722 is approximately 6 dB.

Figure 7B:
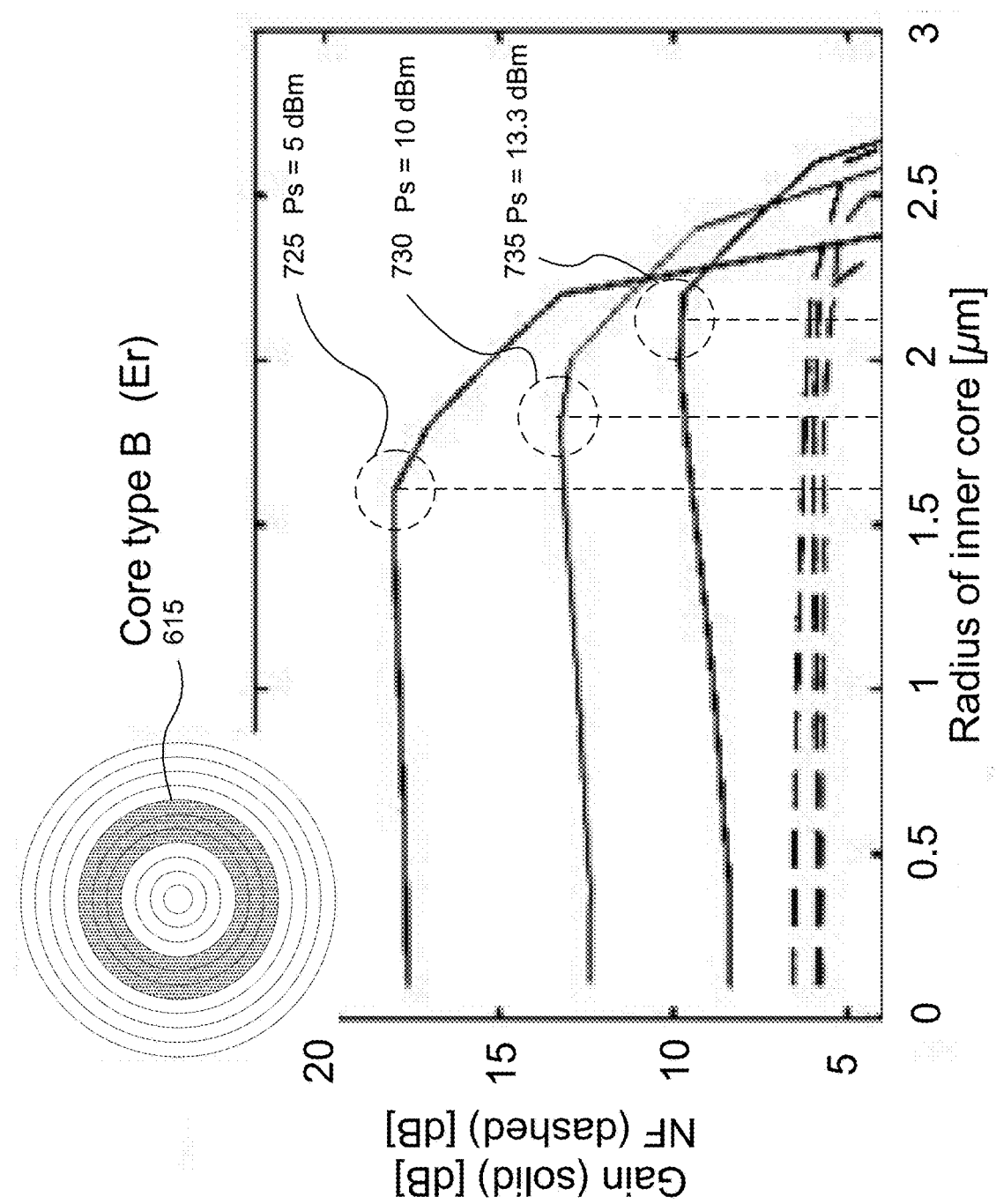
FIG. 7B is a graph showing amplification results wherein a 3 W light is pumping an optical fiber having an outer core doped with Er (core type B).

FIG. 7B is a graph showing amplification with a 3 W MM pump light, of a signal in an optical fiber having an outer core doped with Er (core type B). In this case, simulation results show that for signal input powers of 5 dBm, 10 dBm and 13.3 dBm, the greatest gains in power are obtained with inner core radii of approximately 1.6 μm 725, 1.8 μm 730 and 2.1 μm 735 respectively. Corresponding gains in power are from approximately 8 dB to 18 dB, which is a lower range than with the core of type A, implying the PCE is much lower.

Figure 7C:
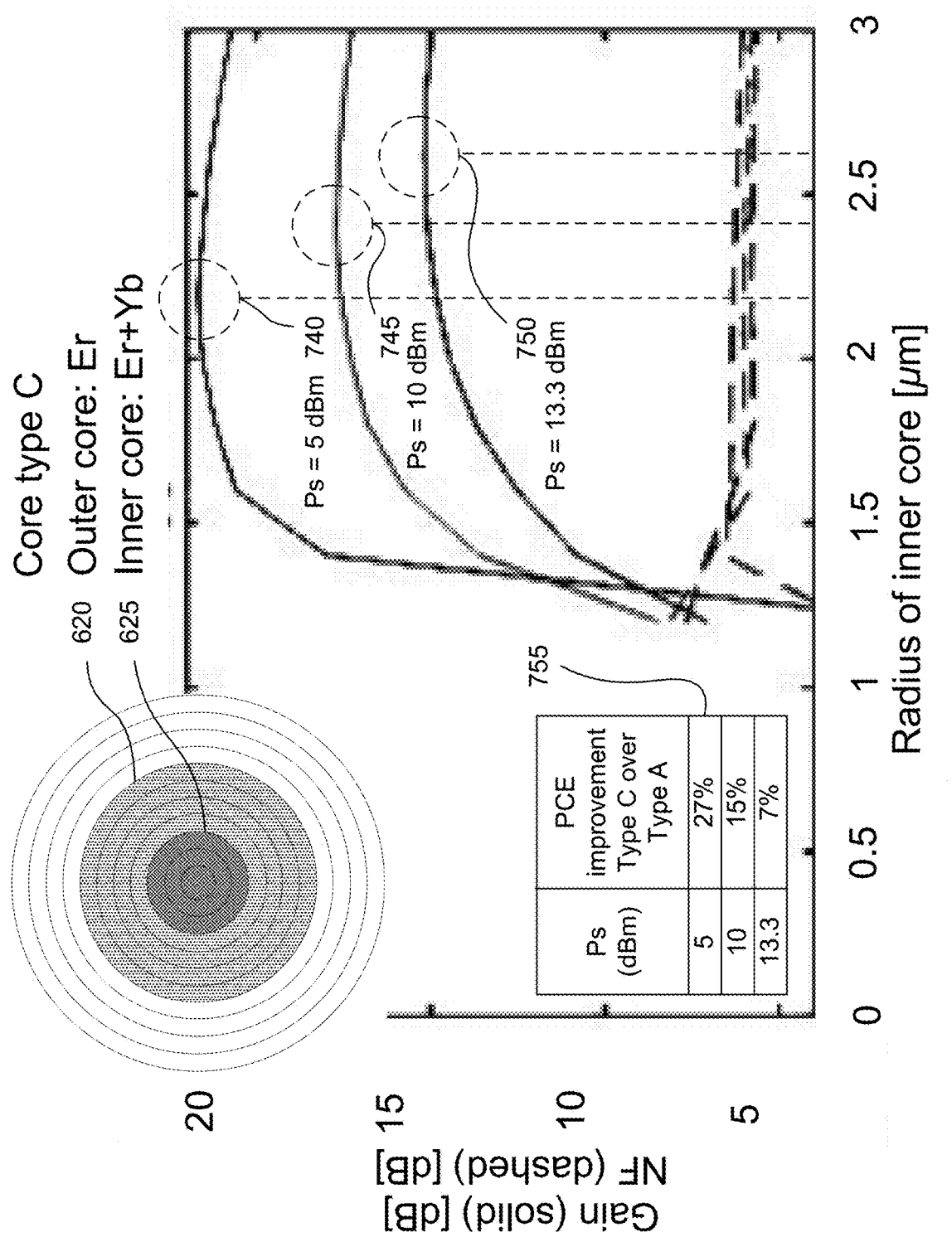
FIG. 7C is a graph showing amplification result wherein a 3 W light is pumping a hybrid EY doped optical fiber having an outer core doped with Er, and an inner core co-doped with Er and Yb (core type C), according to an embodiment.

FIG. 7C is a graph showing amplification with a 3 W MM pump light, of a signal in a hybrid EY doped optical fiber, having an outer core doped with Er, and an inner core co-doped with Er and Yb (core type C), according to an embodiment. For any of the selected signal input powers: Ps=5 dBm 740, Ps=10 dBm 745, and Ps=13.3 dBm 750, the optimal gain values occur for inner core radii of approximately 2.2 μm, 2.4 μm, and 2.6 μm, respectively. Compared to an optical fiber having a core type A, a hybrid EY doped optical fiber having a core type C can provide PCE improvements of 27%, 15%, and 7%, depending on signal input power.

Figure 7D:
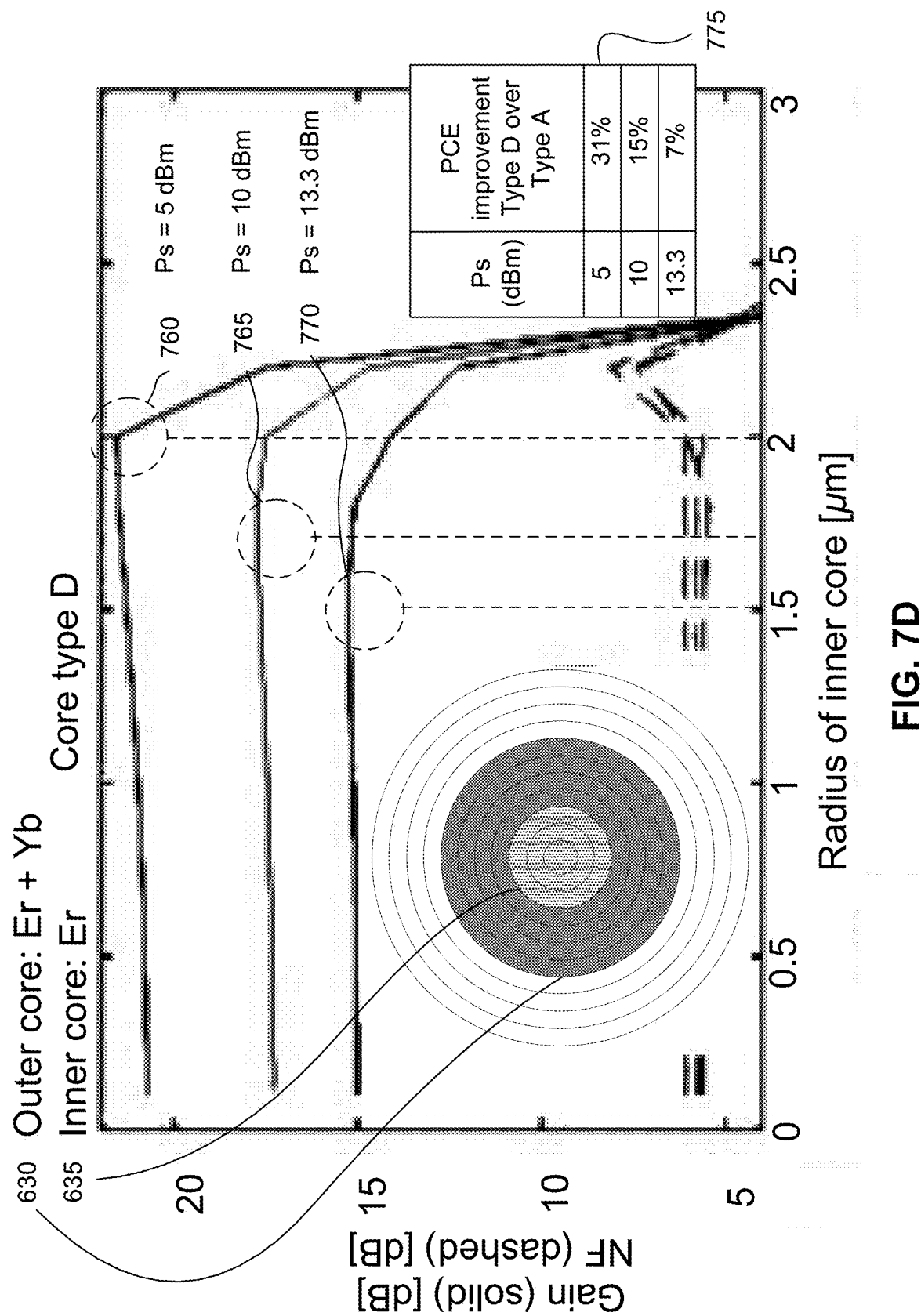
FIG. 7D is a graph showing amplification results wherein a 3 W light is pumping a hybrid EY doped optical fiber having an outer core co-doped with Er and Yb, and an inner core doped with Er (core type D), according to an embodiment.

FIG. 7D is a graph showing amplification with a 3 W MM pump light, of a signal in a hybrid EY doped optical fiber having an outer core co-doped with Er and Yb, and an inner core doped with Er (core type D), according to an embodiment. For a hybrid EY doped optical fiber having a core type D, optimal gains in dB are obtained with inner core radii of approximately 2 μm 760 if Ps is 5 dB, 1.7 μm 765 if Ps is 10 dB, and 1.5 μm 770 if Ps is 13.3 dBm. The PCE improvement of a hybrid EY doped optical fiber having a core type D over with respect to an optical fiber having a core type A can be as much as to 31% 775.

According to embodiments, for inner core sizes having observed optimal radii it has been determined that as the size of an Er doped region increases, absorption of the C-band ASE via its Er ions also increases. Consequently, the total power of the ASE light decreases and the Er inversion in the Er+Yb co-doped region then becomes greater. Under this situation, it has been determined that energy transfer between Yb and Er decreases, which results in optical pumping energy being leaked via ASE from the Yb ions at ~1 μm (approximately 1 μm). It may be determined that when all effects are considered, an optimal radius of the inner core may be determined based on the PCE curve.

Based on the above, it is observed that for a hybrid EY doped optical fiber according to embodiments, there is much less C-band ASE being generated from Er ions, when compared to an optical fiber uniformly doped with Er without Yb.

Figure 8A:
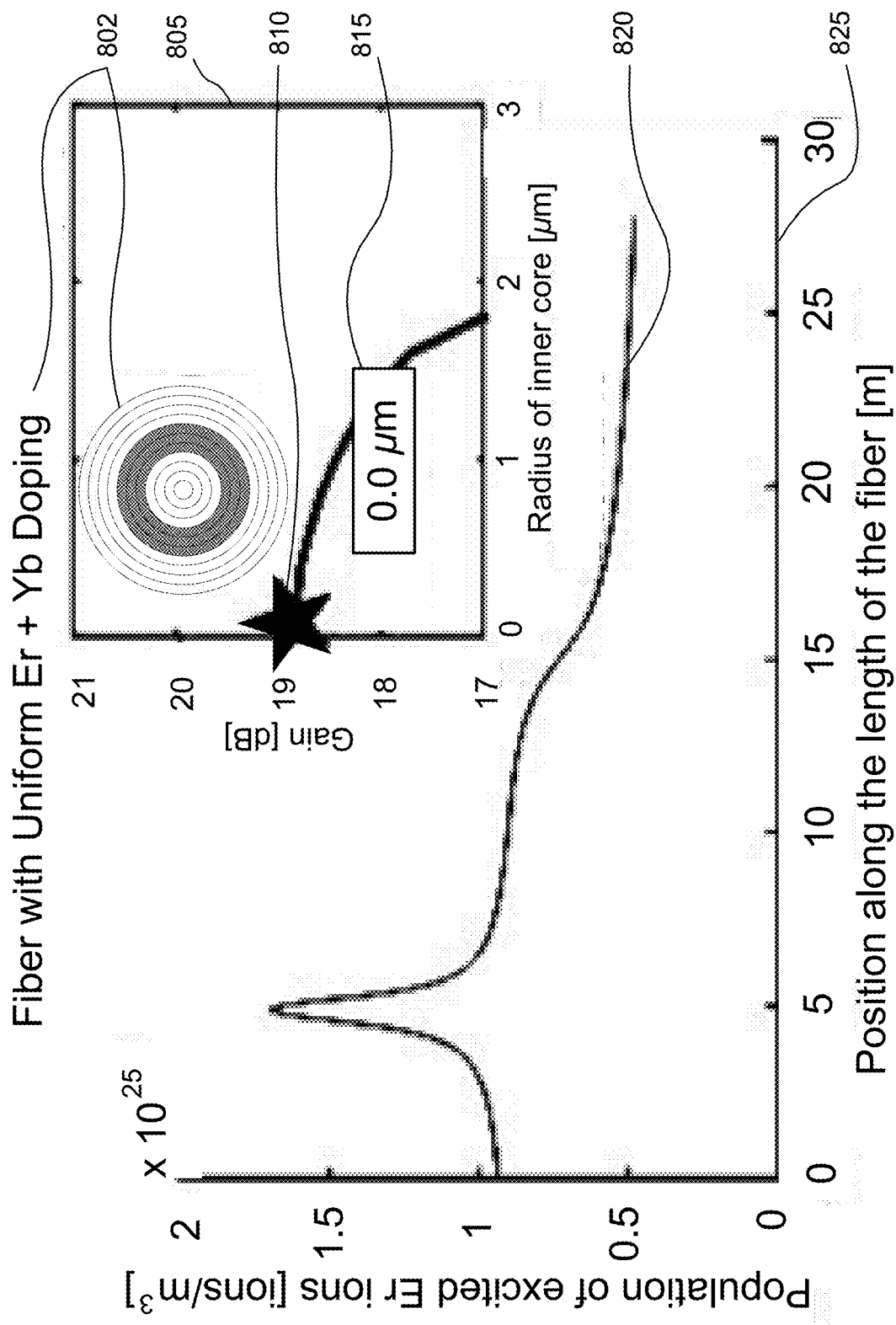
FIG. 8A is a graph showing the density of excited Er atoms at optimal pump conversion efficiency (PCE), for an optical fiber having an outer core uniformly doped with Er+Yb (core type A).

FIG. 8A is a graph showing the density of excited Er ions at optimal pump conversion efficiency (PCE), for an optical fiber having an outer core uniformly doped with Er+Yb (e.g. core type A) 802. A portion of FIG. 7A is shown as an inset 805, illustrating how an optimal PCE 810 can be based on the radius of the fiber's inner core 815, which in this case is 0. The main curve shows the population of excited Er ions 820 along the length of the optical fiber 825.

Figure 8B:
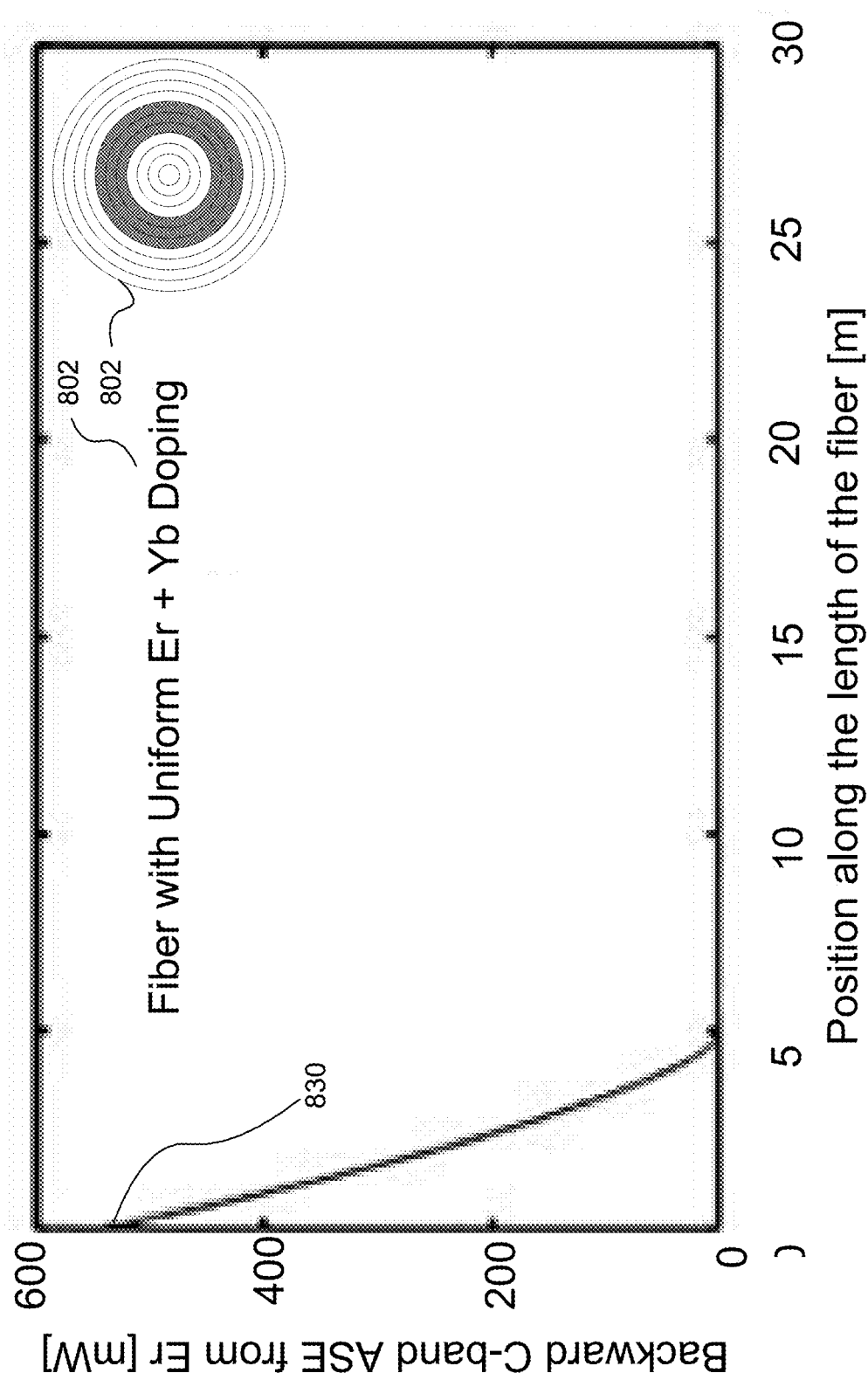
FIG. 8B is a graph showing power lost to C-band ASE of Er, at optimal PCE, for an optical fiber having an outer core uniformly doped with Er+Yb (core type A).

FIG. 8B is a graph showing power lost to C-band ASE from Er, at optimal PCE, for an optical fiber having an outer core uniformly doped with Er+Yb (core type A) 802. In this configuration, the power loss due to backward C-band ASE of Er ions can be approximately 550 mW 830.

Figure 8C:
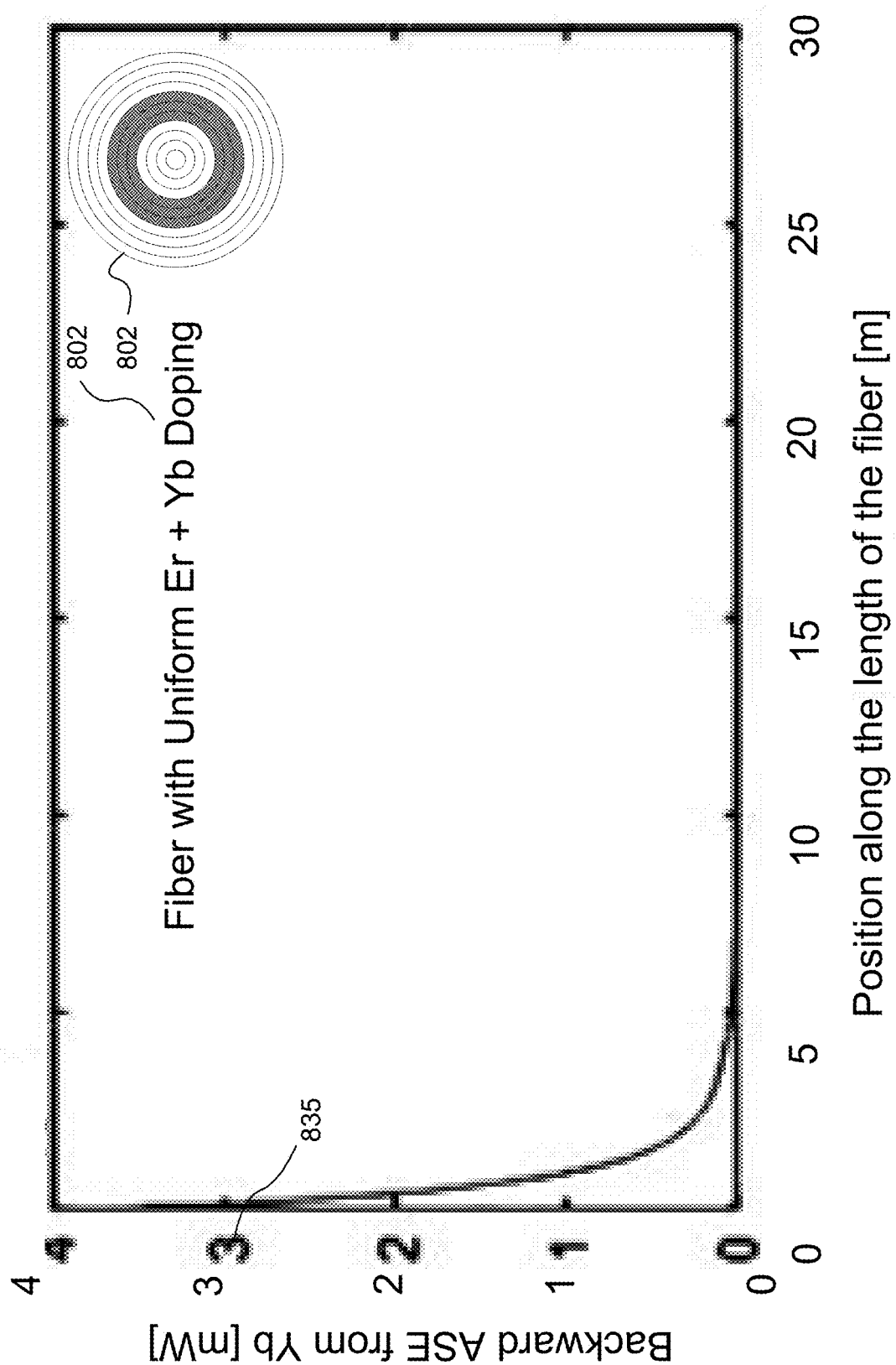
FIG. 8C is a graph showing power lost to ASE of Yb, at optimal PCE, for an optical fiber having an outer core uniformly doped with Er+Yb (core type A).

FIG. 8C is a graph showing power lost to ASE of Yb, at optimal PCE, for an optical fiber having an outer core uniformly doped with Er+Yb (core type A) 802. The power lost to backward ASE from Yb ions is only about 3 mW 835, which is near 0 mW.

Figure 8D:
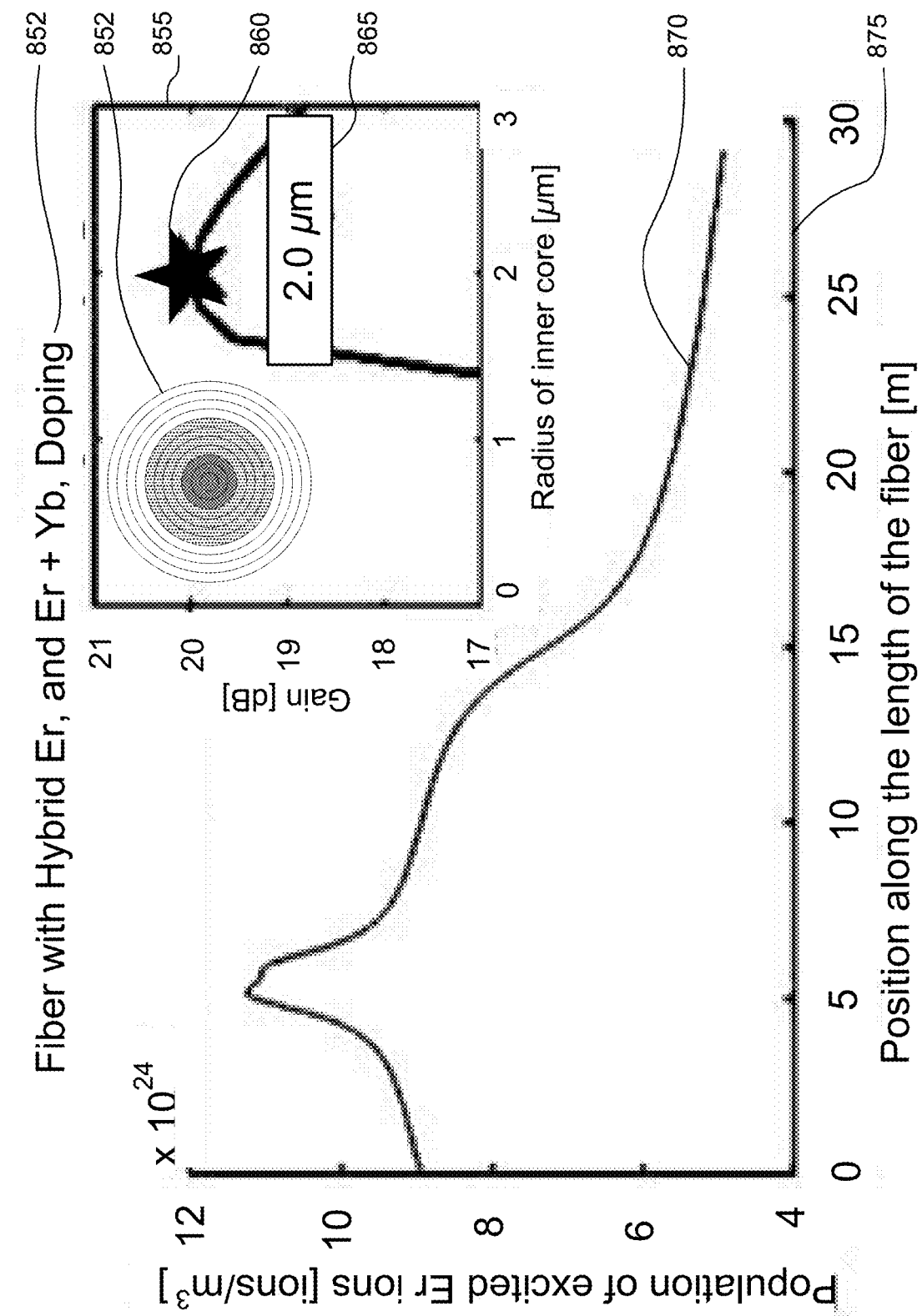
FIG. 8D is a graph showing the density of excited Er atoms at optimal PCE, for a hybrid EY doped optical fiber having an outer core doped with Er, and an inner core co-doped Er+Yb, according to an embodiment.

FIG. 8D is a graph showing the density of excited Er atoms at optimal PCE, for a hybrid EY doped optical fiber having an outer core doped with Er, and an inner core co-doped Er+Yb (core type C) 852, according to an embodiment. A portion of FIG. 7C is shown as an inset 855, illustrating how an optimal PCE 860 can be obtained by appropriate selection of the radius of a fiber's inner core 865, which in an embodiment, can be 2.0 μm. The main curve shows the population of excited Er ions 870 along the length of the optical fiber 875.

Figure 8E:
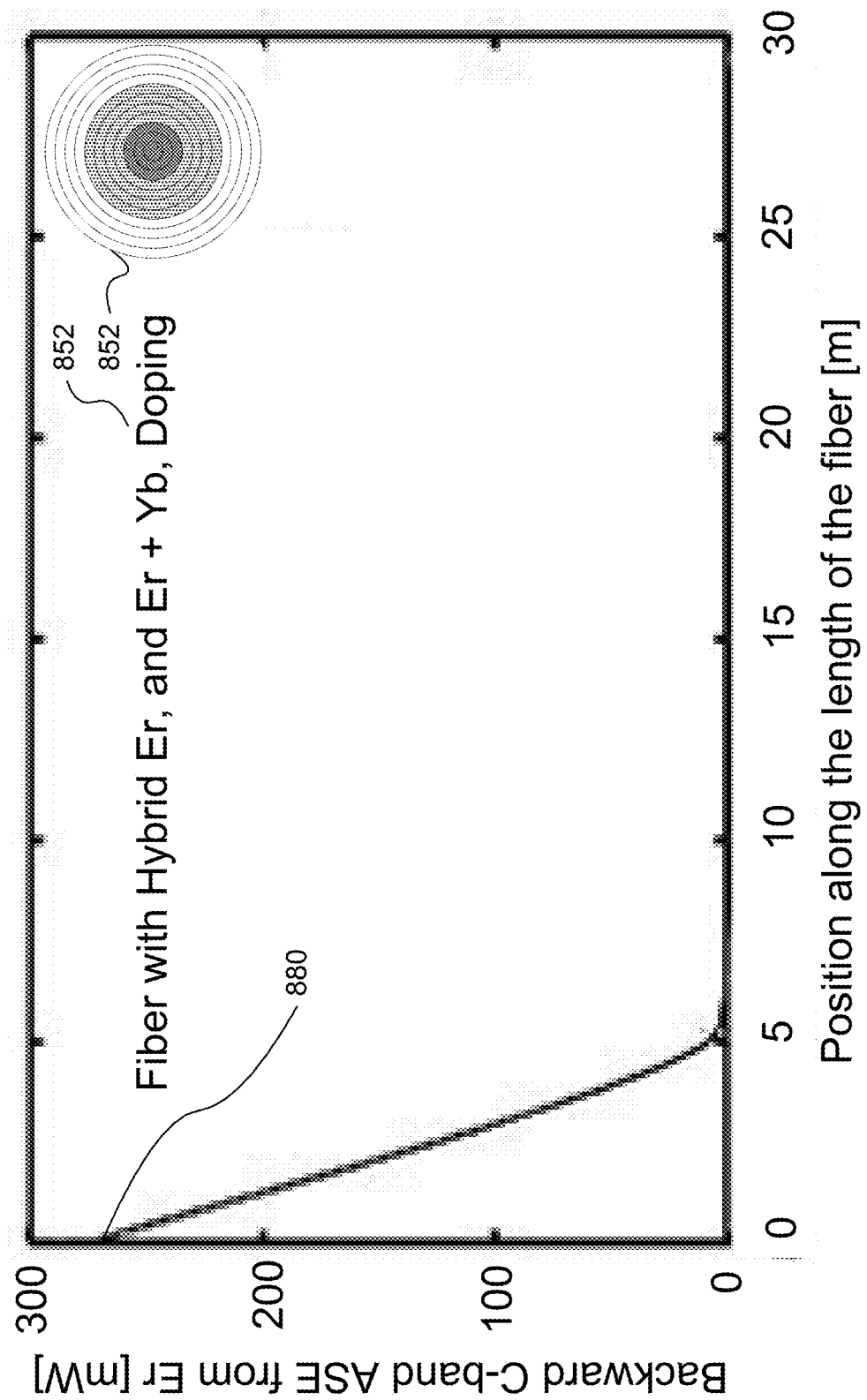
FIG. 8E is a graph showing C-band ASE of Er at optimal PCE, for a hybrid EY doped optical fiber having an outer core doped with Er, and an inner core co-doped with Er+Yb (core type C), according to an embodiment.

FIG. 8E is a graph showing C-band ASE from Er at optimal PCE, for a hybrid EY doped optical fiber having an outer core doped with Er, and an inner core co-doped with Er+Yb (core type C) 852, according to an embodiment. The power lost to backward C-band ASE from Er ions can be approximately 250 mW 880, which is much less than 550 mW obtained 830 in the case of an optical fiber with a core having uniform Er+Yb doping as illustrated in FIG. 8B. The hybrid EY doped optical fiber of this configuration is therefore beneficial as it results in a reduction of the excess loss of pump power.

Figure 8F:
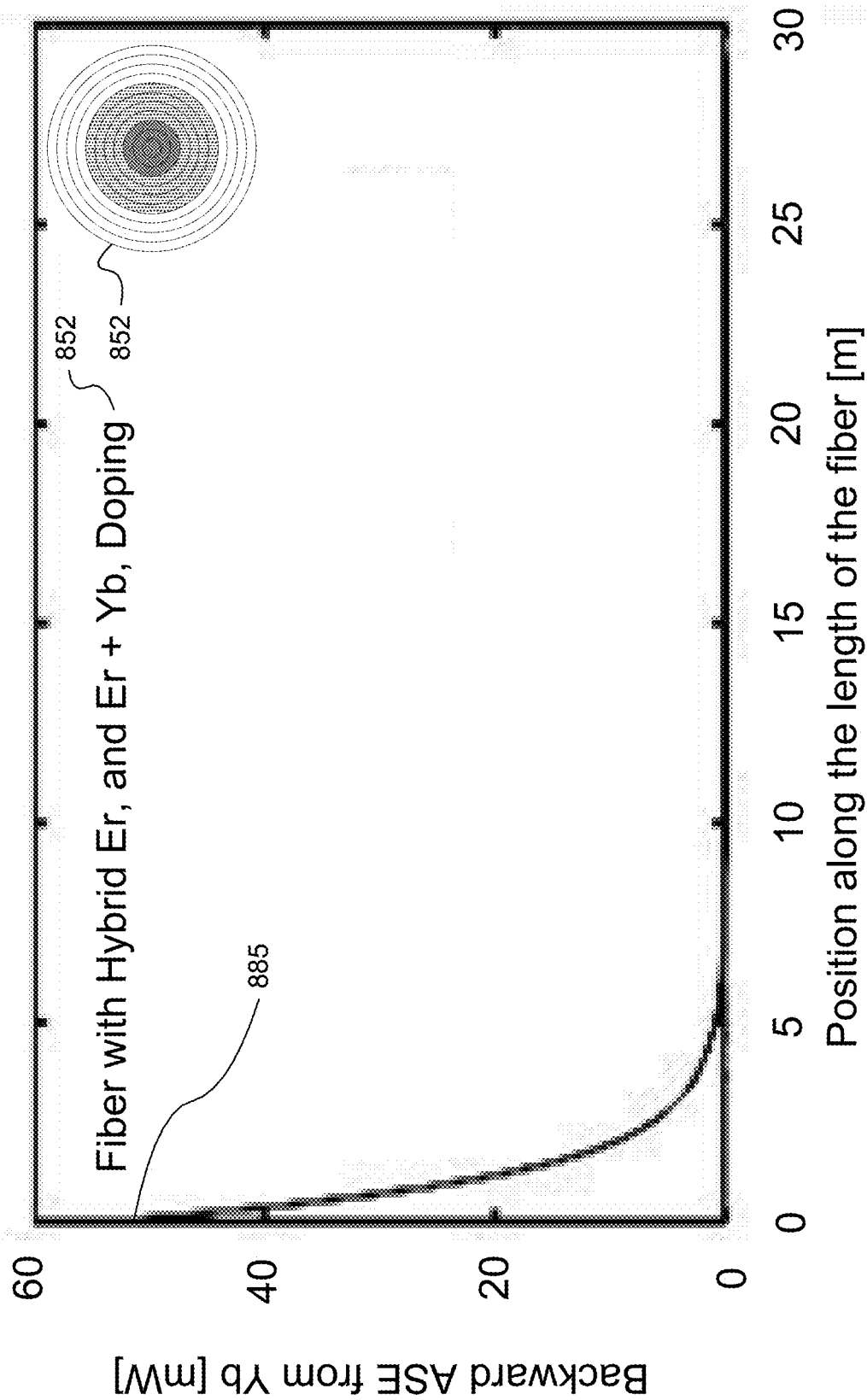
FIG. 8F is a graph showing ASE of Yb at optimal PCE, for a hybrid EY doped optical fiber having an outer core doped with Er, and an inner core co-doped Er+Yb (core type C) 852, according to an embodiment.

FIG. 8F is a graph showing ASE of Yb at optimal PCE, for a hybrid EY doped optical fiber having an outer core doped with Er, and an inner core co-doped Er+Yb (core type C) 852, according to an embodiment. The power loss due to ASE from Yb ions can be approximately 55 mW 885, which is slightly more than with an optical fiber having a core type A. However, considering the power lost to ASE of Er, the overall pump power loss for this configuration of a hybrid EY doped optical fiber is less than that as seen for an optical fiber with a core type A.

A hybrid EY doped optical fiber according to embodiments can have one or more cladding layers, as well as a core area for propagating a signal. A core area can have a hybrid structure in that it can have an inner core, as well as one or more layers, mid-cores, or outer cores, within the one or more cladding layers. The core area includes a first active region and a second active region, wherein the first active region is doped with erbium ions and the second active region is doped with erbium ions and ytterbium ions. Such a structure can enable a multimode pumping light to propagate within the area of the core and the one or more cladding layers. In an embodiment, the shape and cross-section of cladding layers can be circular, but in other embodiments, the shape and cross-section of cladding layers can have a geometry other than circular, for example octagon or other shape, which can be configured to improve the absorption of pumping light by the active regions in the core. In other words, the shape of cladding layers can be configured to improve absorption of pumping light from a source.

FIG. 9A is a cross-section of a hybrid EY doped optical fiber having double cladding, according to an embodiment. A hybrid EY doped optical fiber can have a core region (e.g. a core area) 905 which can further include an outer core 907 doped with Er, and an inner core 909 co-doped with Er+Yb ions, according to embodiments. A first cladding 910 can have a cross-section other than circular, for example octagon or other shape. This shape may be selected to improve the absorption of the multimode pumping light. A second cladding can be circular and may be made of a polymer having a low refractive index 915.

FIG. 9B is a cross-section of a hybrid EY doped optical fiber having a triple cladding, according to an embodiment. A hybrid EY doped optical fiber can have a core region 905, and a first cladding 920 can have a cross-section other than circular, for example octagon or other shape. This shape may be selected to improve the absorption of the multimode pumping light. A second cladding 925 may be configured to further contribute to improving the absorption of pumping light, and a third cladding may be made of a polymer having a low refractive index 930.

A core region or core area 905 can contain two or more regions, such as an inner core region, an outer core region, and one or more middle regions, and any region can be doped with ions, such as rare earth ions. Two or more of the regions in the core area can be configured to be an "active region" of the fiber, in that an active region can be configured to absorb certain wavelengths, and to emit similar or different wavelengths. In an embodiment, there can be at least two active regions, which are doped with different combinations of ions. In some embodiments, at least one active region can be doped with erbium (Er) ions, and at least one active region can be co-doped with both erbium (Er) and ytterbium (Yb) ions.

Returning to FIG. 6C, as illustrated in this figure a cross-section of a hybrid EY doped optical fiber core region can have an outer core 620 that is doped with Er ions, and an inner core 625 that is co-doped with both Er and Yb ions.

Returning to FIG. 6D, as illustrated in this figure a cross-section of a hybrid EY doped optical fiber core region can have an outer core 630 that is co-doped with both Er ions and Yb ions, and an inner core 635 that is doped with Er ions.

In embodiments, an active region can be made of a type of glass matrix and the glass matrix of each active region can be different or the glass matrix of each active region may be the same. A phosphor-silicate (i.e. phosphosilicate) glass can be used for an active region and it can be doped with Er ions, or with both Er and Yb ions (Er+Yb).

In an embodiment, the optimal size of each active region can be selected based on the configuration of an amplifier and the properties of pumping light used for an optical fiber. In an embodiment where the power of an input signal is low and the power of pumping light is relatively high, an active region doped with erbium (Er) can be made larger than otherwise.

During the production of a hybrid EY doped optical fiber according to an embodiment, in some instances there may be unwanted diffusion of Er and Yb doping ions, from one active region to another active region. To prevent this diffusion from occurring, one or more passive regions can be fabricated or formed between the active regions. The provision of one or more passive regions may aid with maintaining a desired Er to Yb ratio during the optical fiber fabrication process.

Therefore, in embodiments including multiple active regions, any two active regions can be isolated from each other by one or more passive regions. An active region does not have to be in contact with another active region.

In an embodiment, a passive region can be made of various types of materials, including $GeO_2$—$SiO_2$; $Al_2O_3$—$SiO_2$; $P_2O_5$—$SiO_2$; pure $SiO_2$ and others. The refractive index of an inactive material can be selected or engineered according to requirements of an active amplifier.

Figure 10B:
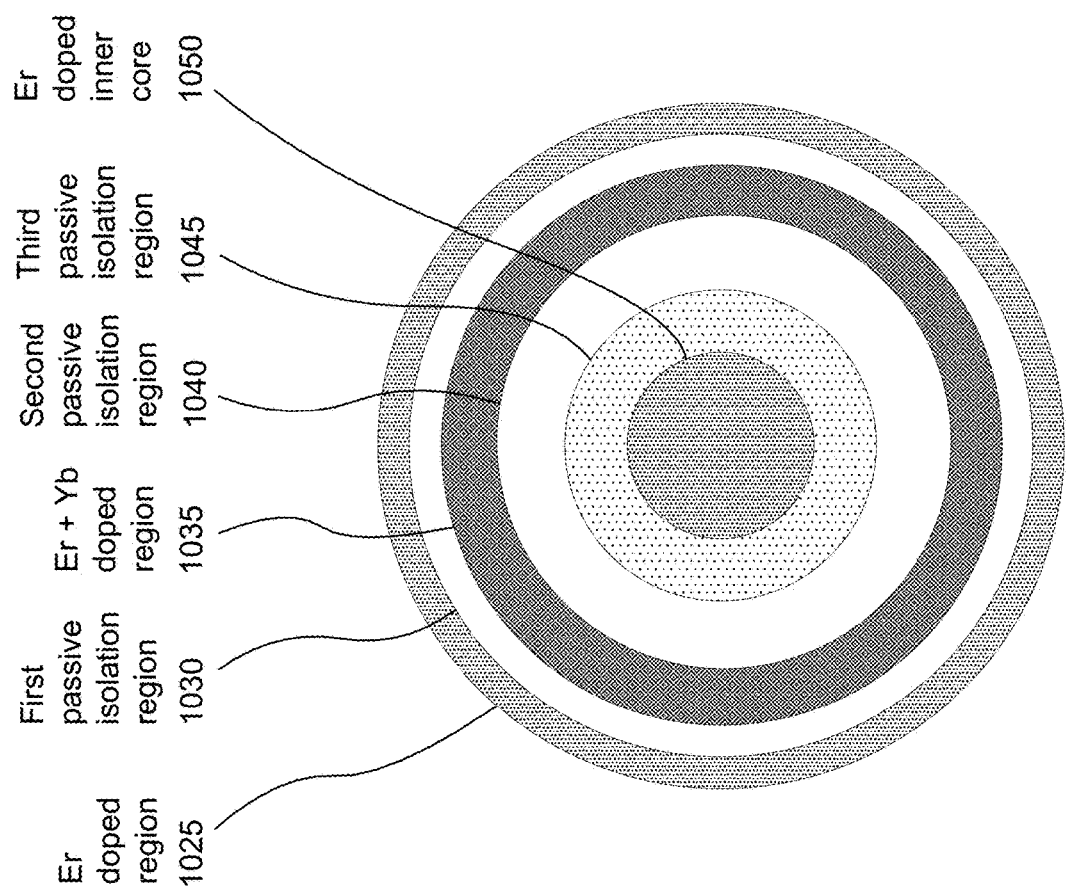
FIG. 10B illustrates a cross-section of a hybrid EY doped optical fiber core having three non-contacting active regions, according to an embodiment.
Figure 10A:
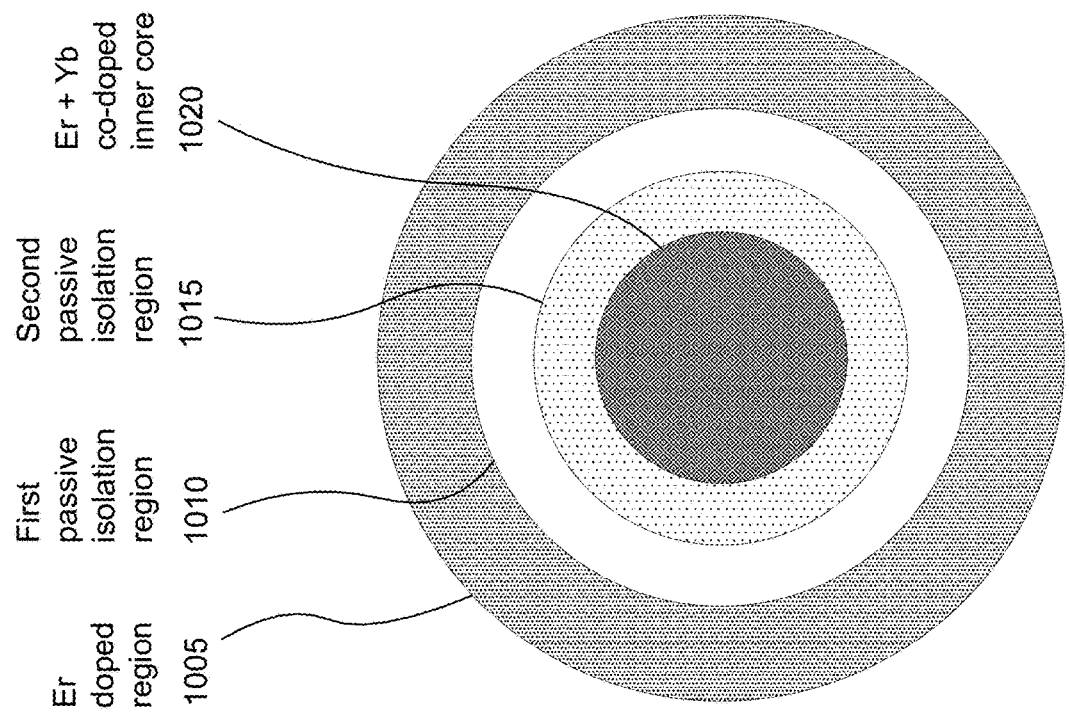
FIG. 10A illustrates a cross-section of a hybrid EY doped optical fiber core having two non-contacting active regions, according to an embodiment.

FIG. 10A illustrates a cross-section of an optical fiber core where two active regions are separated from each other by one or more passive regions, according to an embodiment. An outer core can be an Er doped region 1005 enclosing a first passive isolation region (or passive region) 1010 and a second passive isolation region (or passive region) 1015. In an embodiment, a passive isolation region can be configured to impede ion diffusion from one doped region to another region, and/or to optimize light propagation. An inner core can be co-doped with Er+Yb 1020. In an embodiment where the cross-section of each region is substantially circular, each radius can be selected based on isolation requirements, properties of propagating signal light and pumping light such as their respective modes, wavelengths and power levels, and/or absorption and emission level requirements.

FIG. 10B illustrates a cross-section of an optical fiber core where three active regions are separated from each other, according to an embodiment. An outer active region can be an Er doped layer 1025 enclosing a first passive isolation region 1030. Another active region can be an Er+Yb co-doped region 1035, and a further region can be second passive isolation region 1040. Then, a third passive isolation region 1045 can be bounded by an Er doped inner core 1050. As with a configuration represented by FIG. 10A, the radius of one or more of the regions can be selected based on isolation requirements, properties of propagating signal light and pumping light such as their respective modes, wavelengths and power levels, and/or absorption and emission level requirements.

In some embodiments, a core area of an optical fiber can be designed to support one or more spatial modes. The locations and sizes of the two or more active regions can be selected to optimize amplification of one or several modes. This can be especially useful in the case of a multimode fiber amplifier or a few-mode amplifier, for minimizing modal gain differences.

Figure 10C:
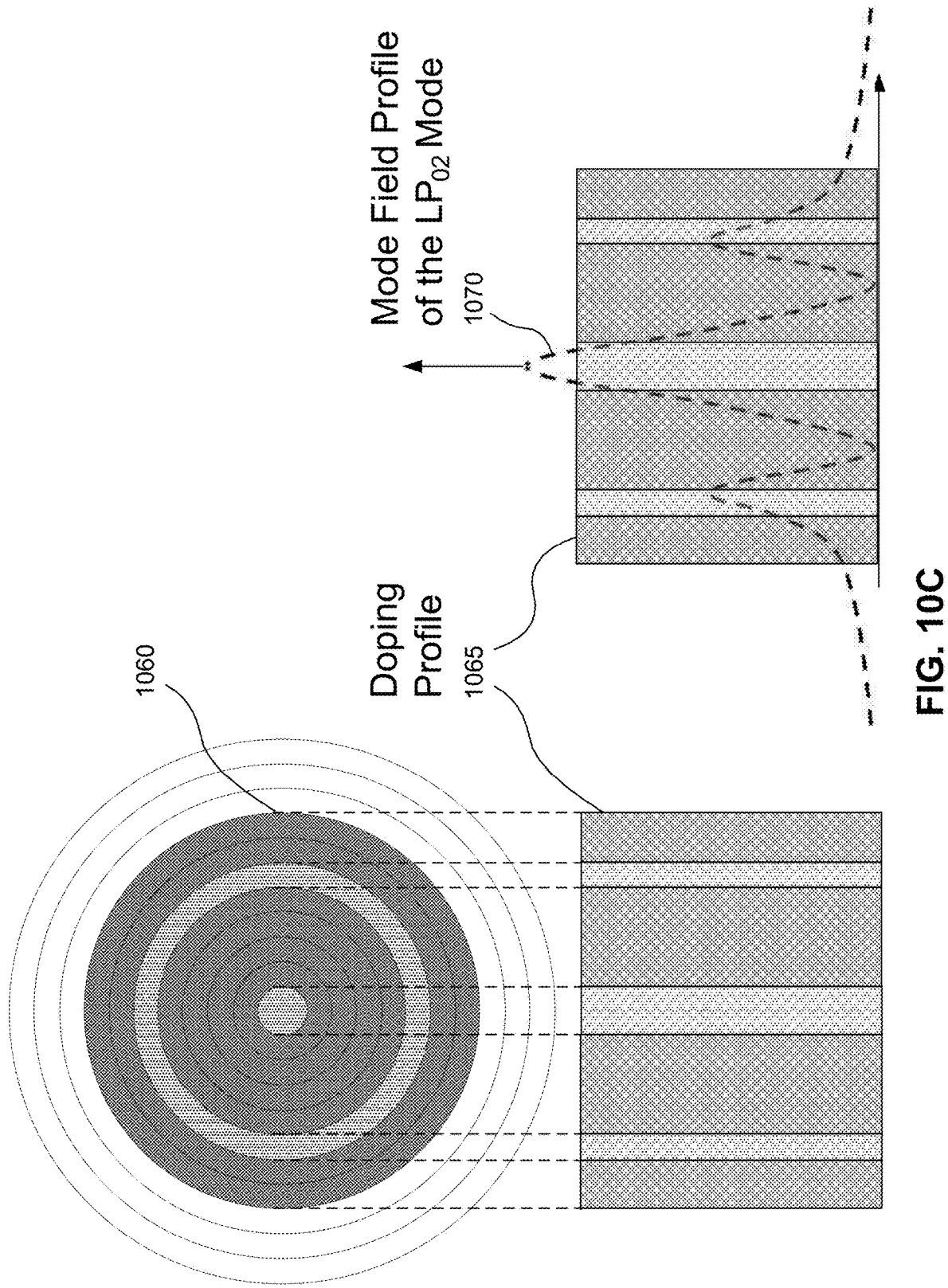
FIG. 10C illustrates a cross-section of a hybrid EY doped optical fiber, doped with Er and Er+Yb in different regions, according to an embodiment.

FIG. 10C is a cross-section of a hybrid EY doped optical fiber, having active regions doped with Er and Er+Yb in different regions, in order to match a field distribution of a selected mode. A core (or core area) 1060 can be doped differently in different regions such that the doping profile 1065 of the core area across its diameter corresponds to one or more selected mode field profiles of an optical signal. In an embodiment, a selected mode can be the linearly polarized (LP) mode such as the $LP_{02}$ mode. In an embodiment, an optical fiber's core are doping profile 1110 can be configured to match the mode field profile of an $LP_{02}$ mode 1070.

In an embodiment, an Er+Yb co-doped area can be configured and sized to match with the mode field distribution of an $LP_{02}$ mode, so as to provide a desired level of gain to the $LP_{02}$ mode. In FIG. 10C, the lighter areas of the doping profile 1065 can represent Er+Yb co-doping, and the darker areas can represent Er doping. In another embodiment, the lighter areas of the doping profile 1065 can represent Er doping, and the darker areas can represent Er+Yb co-doping. Embodiments include doping profiles that include both Er doping and Er+Yb co-doping, in configurations supporting LP mode profiles, and configurations supporting other mode profiles.

Embodiments having an Er doped active region, and an Er+Yb doped active region, include fibers having cross-sections configured to propagate desired mode distributions. In such embodiments, active regions can be side-to-side instead of being concentric, and each active region can be doped differently.

Figure 11B:
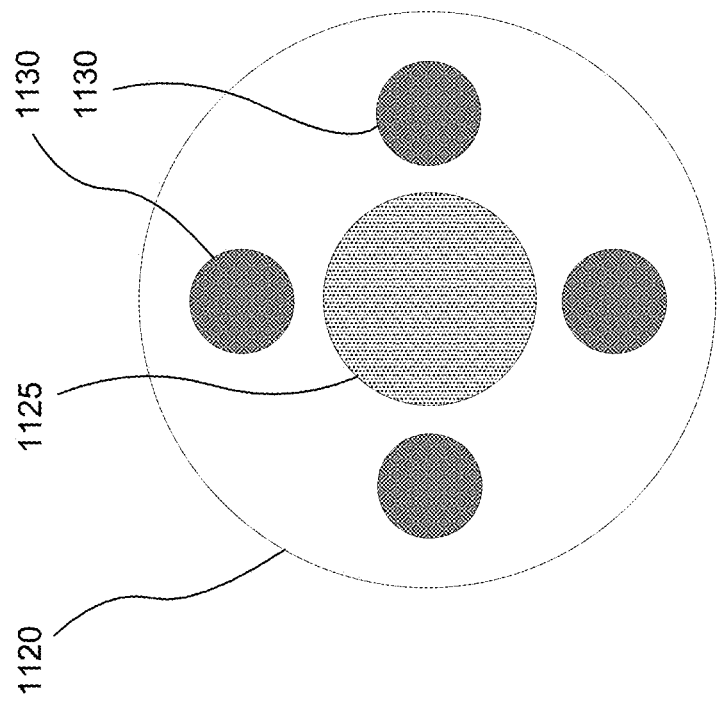
FIG. 11B illustrates a cross-section of a hybrid EY doped optical fiber core including five separate inner cores which together may support super modes or modes with desired mode field distributions, according to an embodiment.
Figure 11A:
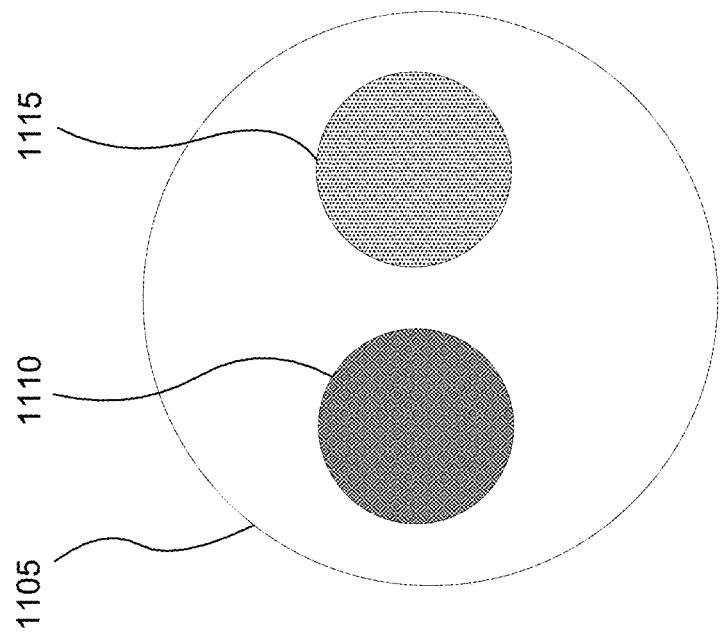
FIG. 11A illustrates a cross-section of a hybrid EY doped optical fiber core including two separate inner cores which together may support super modes or modes with desired mode field distributions, according to an embodiment.

FIG. 11A illustrates a cross-section of an optical fiber including a core area including two separated active regions which together can support super modes, or modes with specially-engineered mode field distributions, according to an embodiment. An optical fiber can include one Er+Yb co-doped active region 1110, and one Er doped active region 1115, and these active regions can be separated by a cladding structure 1105 completing the optical fiber. Embodiments also include configurations in which there are more than two active regions of the optical fiber in the core area.

FIG. 11B illustrates a cross-section of an optical fiber core (or core area) including five separated active regions which together can support super modes, or modes with specially-engineered mode field distributions, according to an embodiment. An optical fiber can include one Er doped active region 1125, and multiple Er+Yb co-doped active regions 1130, and each of these active regions can be spaced based on parameters of a signal light and/or a pumping light used with the optical fiber. The multiple active regions of the core are can be separated by a cladding structure 1120 completing the optical fiber. As illustrated in FIG. 11B the multiple Er+Yb co-doped active regions can be configured as four separate active regions that are substantially equally distanced around the Er doped active region, however it will be readily understood that there can be more or less of the multiple Er+Yb co-doped active regions.

In embodiments, a hybrid EY doped optical fiber can further include a single stage fiber amplifier, or an array of fiber amplifiers.

An amplifier or an amplifier array can include a signal-pump combiner having a port to collect a WDM signal light in the L-band as an input to be amplified, and one or more ports to collect multimode pumping light to amplify the signal. A signal-pump combiner can then send the signal and pumping light into a cladding structure of a hybrid EY doped optical fiber according to an embodiment. At least two types of signal-pump combiners can be used: one type configured for end-coupling with an optical fiber, and another type configured for side-coupling with an optical fiber.

For a hybrid EY doped optical fiber according to an embodiment, a pumping light, i.e. optical wavelengths used to amplify a signal, should at least include the optical wavelength of 915 nm, and it can be a from a multimode light source.

Figure 12A:
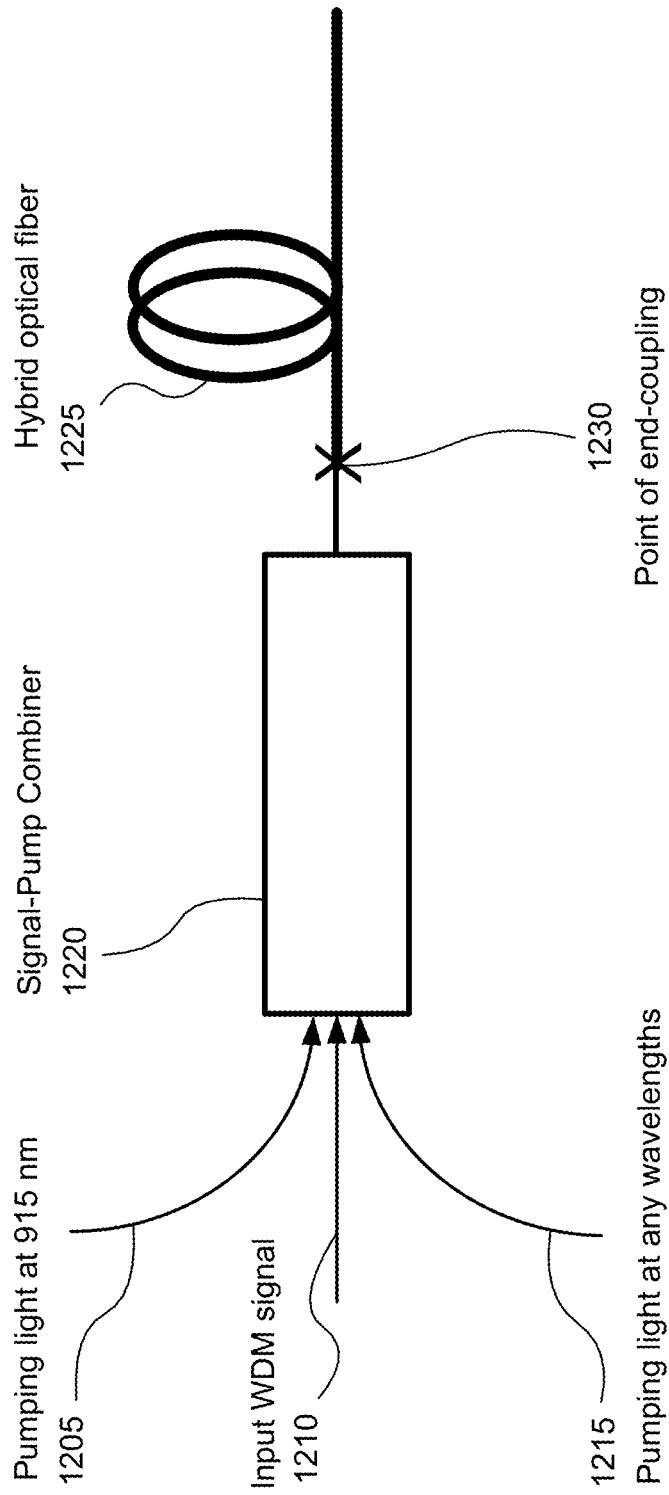
FIG. 12A illustrates a signal-pump combiner with end-coupling of the pump, being operated with a hybrid EY doped optical fiber according to an embodiment.

FIG. 12A illustrates a signal-pump combiner with end-coupling of the pumping light, being operated with a hybrid EY doped optical fiber according to an embodiment. A pumping light including the optical wavelength of 915 nm 1205, a pumping light including other wavelengths 1215, and an input WDM signal 1210 can enter a signal-pump combiner 1220 coupled to a hybrid EY doped optical fiber 1225 according to an embodiment. In this case, pumping light and signal light can be combined, and enter a hybrid EY doped optical fiber at a same point of end-coupling 1230, thereby making the system a hybrid EY doped optical fiber amplifier.

Figure 12B:
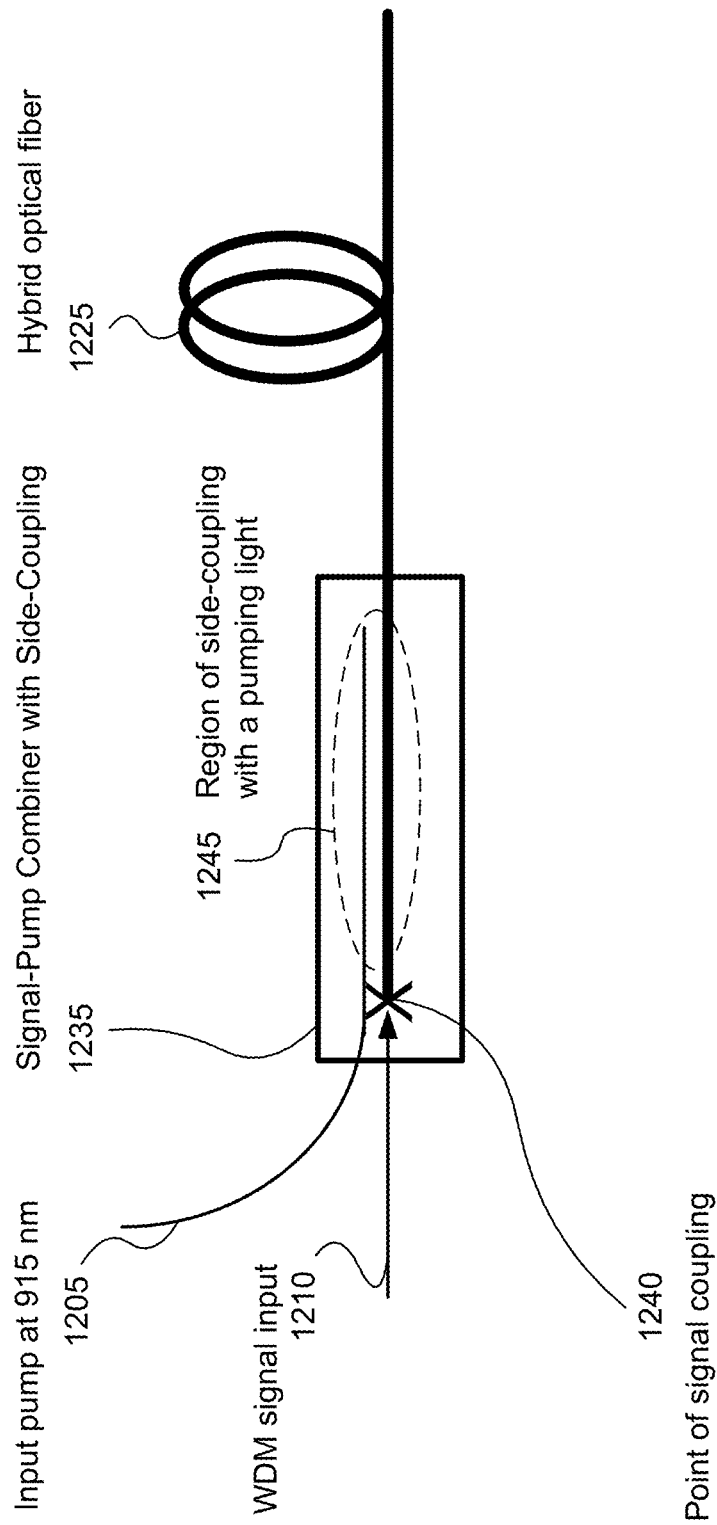
FIG. 12B illustrates a signal-pump combiner with side-coupling of the pump, being operated with a hybrid EY doped optical fiber according to an embodiment.

FIG. 12B illustrates a signal-pump combiner with side-coupling of the pumping light, being operated with a hybrid EY doped optical fiber according to an embodiment. A pumping light including the 915 nm wavelength 1205 can enter a signal-pump combiner through side-coupling 1235, and an input WDM signal 1210 can enter the signal-pump combiner through end-coupling 1240. An input signal can be amplified via optical pumping along a region of side-coupling 1245, and be propagated to a hybrid EY doped optical fiber 1225.

Embodiments include a hybrid EY doped optical fiber having a hybrid core in that it includes at least two active regions that are doped differently, the active regions being amplified with a source of multimode light acting as a fiber signal amplifier (i.e. fiber amplifier), or an arrays such fiber amplifiers, resulting in multiple stage amplification of a fiber signal.

Embodiments include a hybrid EY doped optical fiber, used with one or more pre-amplifier stages having a core-pumping scheme and Er doped fibers.

Embodiments includes a hybrid EY doped optical fiber as described, amplified with one or more mid-stages and/or boost-stages, any one of which can share the same source of multimode pumping light.

Figure 13:
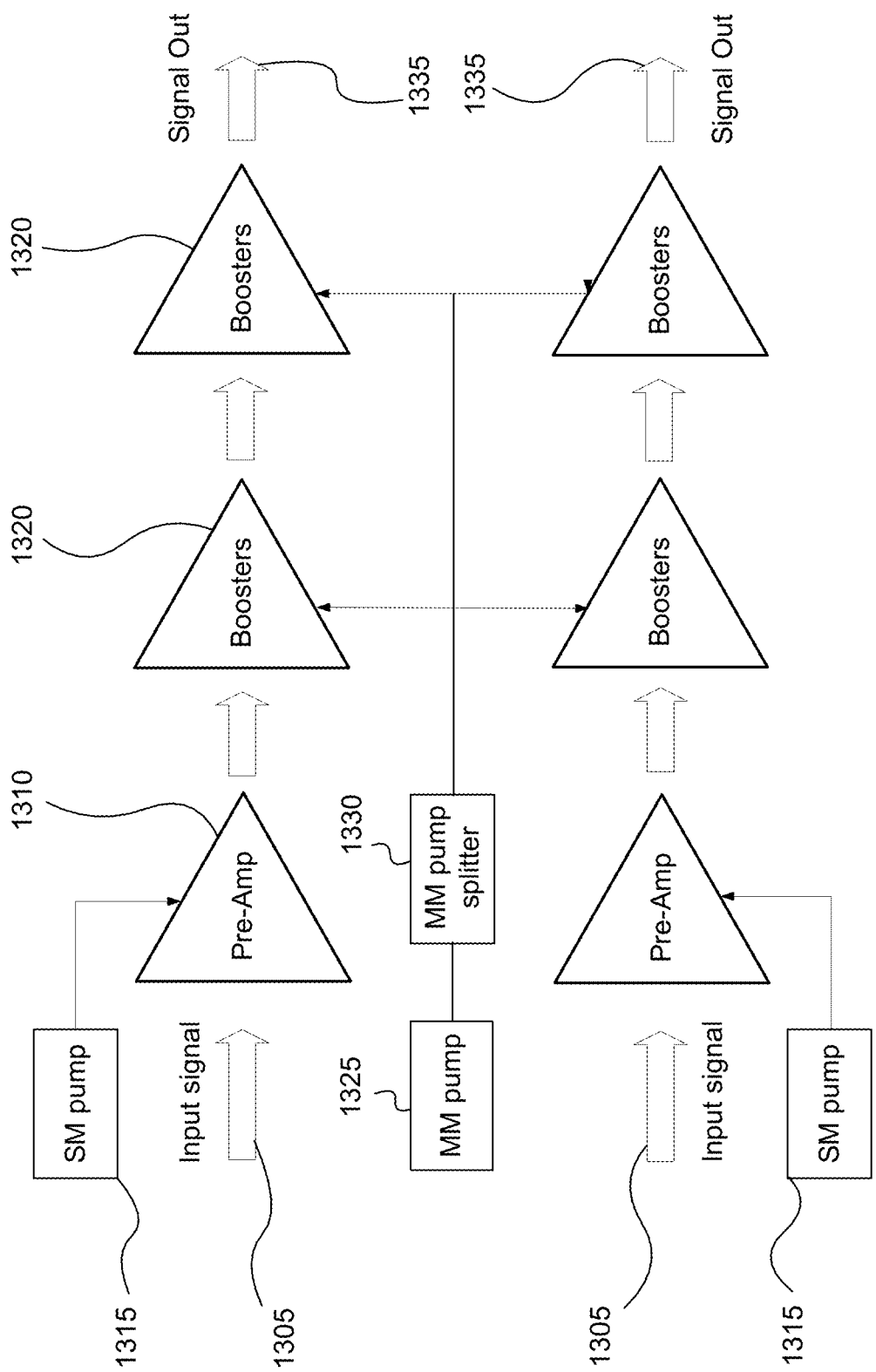
FIG. 13 illustrate a configuration of an amplifier array based on the sharing of the MM pump, according to an embodiment

FIG. 13 illustrate a configuration of a system for producing two amplified signals, according to an embodiment. In this configuration, input signals 1305 are injected into respective pre-amplifiers 1310, each pre-amplifier pumped with a single mode (SM) pump 1315 light source. Pre-amplified signals are directed to boosting amplifiers (i.e. boosters) 1320, pumped by a multimode pump 1325 light source which is split for each booster by a multimode pump splitter 1330. Each input signal 1305, as amplified by the various stages, can become an output signal 1335. Hybrid EY doped optical fibers according to embodiments of the present disclosure can be used in the boosters 1320. In this configuration the use of a hybrid EY doped optical fiber according to embodiments, enables the use of a single multimode pump for transmission of input signals to plural boosters. Alternative embodiments can include more sources of pumping light, more pre-amplifiers, more boosters, more pump splitters, and more input signals.

Figure 14:
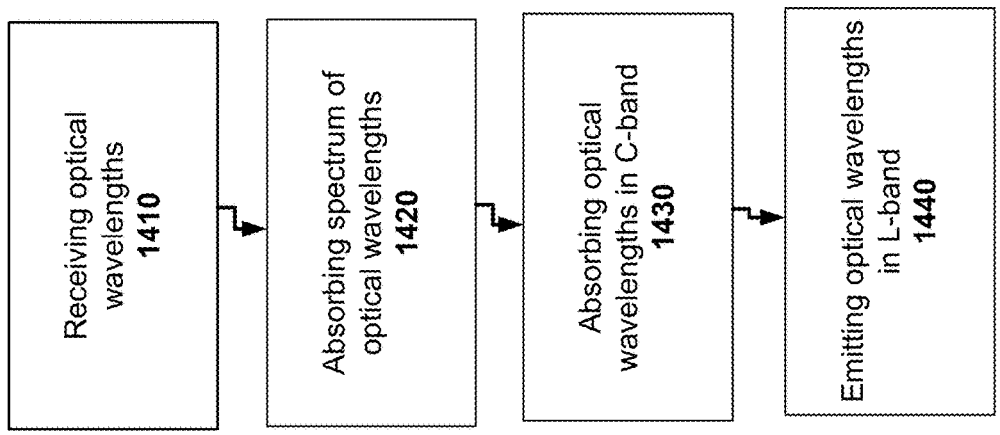
FIG. 14 illustrates a method for increasing optical pump conversion efficiency (PCE) for an optical fiber pumped by a multi-mode pump diode, according to embodiments.

FIG. 14 illustrates a method for increasing optical pump conversion efficiency (PCE) for an optical fiber pumped by a multi-mode pump diode, according to embodiments. The optical fiber includes a first active region and a second active region, the first active region doped with erbium ions and the second active region doped with erbium ions and ytterbium ions, the optical fiber further including a cladding layer surrounding the core area. The method includes receiving 1410, by the optical fiber, optical wavelengths from the multi-mode pump diode and absorbing 1420, by the second active region, a spectrum of optical wavelengths. The method further includes absorbing 1430, by the first active region, optical wavelengths in a C-band and emitting 1440, by both the first active region and the second active region, optical wavelengths in the L-band, via stimulated emission.

Embodiments have been described above in conjunction with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. An optical fiber having a length and a cross sectional area, the cross-sectional area of the optical fiber comprising:
a core area including a first active region and a second active region, the second active region arranged concentrically to the first active region, the first active region doped with erbium ions without ytterbium ions, and the second active region co-doped with erbium ions and ytterbium ions; and
a cladding layer surrounding the core area.

2. The optical fiber according to claim 1, wherein the first active region is surrounded by the second active region.

3. The optical fiber according to claim 1, wherein the second active region is surrounded by the first active region.

4. The optical fiber according to claim 1, wherein the core area further comprises a passive region configured to separate the first active region and the second active region.

5. The optical fiber according to claim 4, wherein the passive region is formed from a material including $GeO_2$—$SiO_2$; $Al_2O_3$—$SiO_2$; $P_2O_5$—$SiO_2$ and pure $SiO_2$.

6. The optical fiber according to claim 1, wherein the core area further comprises a passive region, the passive region surrounding an inner core area and the passive region surrounded by an outer core area, wherein the inner core is the first active region or the second active region and the outer core area is the other of the first active region or the second active region.

7. The optical fiber according to claim 1, wherein the first active region is positioned centrally in the core area and the second active region includes multiple separated regions positioned around the first active region, wherein the core area further includes a passive region separating each of the first active region and the multiple separated regions of the second active region.

8. The optical fiber according to claim 1, wherein the cladding layer surrounding the core area has a non-circular shape and the cladding layer is surrounded by a second cladding layer.

9. The optical fiber according to claim 8, further comprising a third cladding layer surrounding the second cladding layer.

10. The optical fiber according to claim 1, wherein the core area further comprises a third active region, a first passive region and a second passive region, the third active region doped with erbium ions, the first passive region surrounding the first active region which is centrally located within the cross-sectional area of the optical fiber, the second active region surrounding the first passive region, the second passive region surrounding the second active region and the third active region surrounding the second passive region.

11. The optical fiber according to claim 1, wherein the core area further comprises a third active region and a fourth active region, the third active region doped with erbium ions and the fourth active region doped with erbium ions and ytterbium ions, the first active region is centrally located in the cross-sectional area of the optical fiber, the first active region surrounded by the second active region, the second active region surrounded by the third active region and the third active region surrounded by the fourth active region.

12. The optical fiber according to claim 1, wherein at least one of the active regions includes phosphor-silica glass.

13. The optical fiber according to claim 1, wherein the optical fiber is configured to receive optical wavelength light from a multi-mode pump diode.

14. The optical fiber according to claim 1, wherein the optical fiber is configured to receive optical wavelengths encompassing an optical wavelength of 915 nm.

15. A method for increasing optical pump conversion efficiency (PCE) for an optical fiber pumped by a multi-mode pump diode, the optical fiber including a first active region and a second active region, the second active region arranged concentrically to the first active region, the first active region doped with erbium ions without ytterbium ions, and the second active region co-doped with erbium ions and ytterbium ions, the optical fiber further including a cladding layer surrounding the core area, the method comprising:
- receiving, by the optical fiber, optical wavelengths from the multi-mode pump diode;
- absorbing, by the second active region, a spectrum of optical wavelengths;
- absorbing, by the first active region, optical wavelengths in a C-band;
- emitting, by both the first active region and the second active region, optical wavelengths in the L-band, via stimulated emission.

16. A system for amplifying an L-band signal, the system comprising:
- a source of multimode pumping light;
- a signal-pump combiner optically coupled to the source; and
- an optical fiber optically coupled to the source and signal-pump combiner, the optical fiber including a first active region and a second active region, the second active region arranged concentrically to the first active region, the first active region doped with erbium ions without ytterbium ions, and the second active region co-doped with erbium ions and ytterbium ions, the optical fiber further including a cladding layer surrounding the core area.

17. The system of claim 16, further comprising a splitter directing multimode light from the source to the signal-pump combiner.

18. The system of claim 16, further comprising a source of single mode light providing optical wavelengths to the signal-pump combiner.

* * * * *